United States Patent [19]
Hata et al.

[11] Patent Number: 5,602,907
[45] Date of Patent: Feb. 11, 1997

[54] METHOD AND SYSTEM FOR ACCOUNTING COMMUNICATION CHARGES

[75] Inventors: Emi Hata; Kenji Nemoto, both of Kawasaki, Japan

[73] Assignee: Fujitsu Limited, Kanagawa, Japan

[21] Appl. No.: 284,002

[22] Filed: Aug. 1, 1994

[30] Foreign Application Priority Data

Jan. 21, 1994 [JP] Japan .................................. 6-005457

[51] Int. Cl.⁶ .................................................. H04M 15/00
[52] U.S. Cl. .......................... 379/114; 379/112; 379/113; 379/115; 379/118; 379/130; 379/133; 379/136; 379/140
[58] Field of Search ........................... 379/111–115, 118, 379/125–127, 130, 133, 140, 136

[56] References Cited

U.S. PATENT DOCUMENTS

| | | | |
|---|---|---|---|
| 4,788,719 | 11/1988 | Gupta | 379/114 |
| 4,791,640 | 12/1988 | Sand | 379/114 |
| 4,935,956 | 6/1990 | Hellwarth | 379/112 |
| 5,146,491 | 9/1992 | Silver | 379/114 |
| 5,218,632 | 6/1993 | Cool | 379/112 |
| 5,222,125 | 6/1993 | Creswell | 379/112 |
| 5,263,084 | 11/1993 | Chaput et al. | 379/142 |
| 5,303,297 | 4/1994 | Hillis | 379/114 |
| 5,381,467 | 1/1985 | Rosinski | 379/114 |

Primary Examiner—Wellington Chin
Assistant Examiner—Vijay Shankar

[57] ABSTRACT

During an execution of communications between an originating terminal and a receiving terminal which are connected through an ISDN, when an item of information saying that a rate at which charges for the communications are shared between these terminals is changed to a given rate is transmitted from either the originating terminal or the receiving terminal to the ISDN, the communication charges after transmitting this item of information are imposed on the originating terminal and/or the receiving terminal in accordance with this rate presented. If an agreement of the other terminal is not obtained on this occasion, the charges are imposed on the originating terminal and/or the receiving terminal in accordance with an original accounting rate or the rate presented from the other terminal.

14 Claims, 25 Drawing Sheets

FIG. 7

| PROTOCOL IDENTIFIER |
| --- |
| CALLING NUMBER |
| MESSAGE TYPE |
| TRANSFERRING CAPABILITY |
| CHANNEL IDENTIFIER |
| FACILITY |
| PASSAGE IDENTIFIER |
| DISPLAY |
| KEY PAD FACILITY |
| SIGNAL |
| FEATURE ACTIVATION |
| FEATURE INDICATION |
| ORIGINATING NUMBER |
| ORIGINATING SUBADDRESS |
| RECEIVING NUMBER |
| RECEIVING SUBADDRESS |
| RELAY NETWORK SELECTION |
| LOW-ORDER LAYER INTEGRITY |
| LOW-ORDER LAYER INTEGRITY |
| USER/USER |
| ACCOUNTING RATE INFORMATION ELEMENT |

FIG.8

| PROTOCOL IDENTIFIER |
| --- |
| CALLING NUMBER |
| MESSAGE TYPE |
| CHANNEL IDENTIFIER |
| FACILITY |
| PASSAGE IDENTIFIER |
| DISPLAY |
| SIGNAL |
| FEATURE ACTIVATION |
| FEATURE INDICATION |
| LOW-ORDER LAYER INTEGRITY |
| USER/USER |
| ACCOUNTING RATE INFORMATION ELEMENT |

FIG.10

| PROTOCOL IDENTIFIER |
| --- |
| CALLING NUMBER |
| MESSAGE TYPE |
| REASON DISPLAY |
| DISPLAY |
| KEY PAD FACILITY |
| SIGNAL |
| FEATURE ACTIVATION |
| FEATURE INDICATION |
| ACCOUNTING RATE INFORMATION ELEMENT |

FIG.11

| PROTOCOL IDENTIFIER |
| --- |
| CALLING NUMBER |
| MESSAGE TYPE |
| DISPLAY |

FIG.12

| PROTOCOL IDENTIFIER |
| --- |
| CALLING NUMBER |
| MESSAGE TYPE |
| DISPLAY INFORMATION ELEMENT |
| ACCOUNTING CHANGEOVER INFORMATION ELEMENT |

FIG.13

| PROTOCOL IDENTIFIER |
| --- |
| CALLING NUMBER |
| MESSAGE TYPE |
| CHANNEL IDENTIFIER |
| DISPLAY |

FIG.14

| PROTOCOL IDENTIFIER |
| --- |
| CALLING NUMBER |
| MESSAGE TYPE |
| CHANNEL IDENTIFIER INFORMATION ELEMENT |
| DISPLAY INFORMATION ELEMENT |
| ACCOUNTING CHANGEOVER INFORMATION ELEMENT |

```
        ORIGINATING USER : RECEIVING USER
           8 0 (h)            1 0 : 0
           8 1 (h)             9 : 1
           8 2 (h)             8 : 2
           8 3 (h)             7 : 3
           8 4 (h)             6 : 4
           8 5 (h)             5 : 5
           8 6 (h)             4 : 6
           8 7 (h)             3 : 7
           8 8 (h)             2 : 3
           8 9 (h)             1 : 9
           8 A (h)             0 : 1 0
```

FIG.17

```
 7  6  5  4  3  2  1  0
┌───┬──────────────────────────┐
│I/O│ACCOUNTING  APPROVAL/NON  │
│   │RATE         -APPROVAL    │
└───┴──────────────────────────┘
```

80 (h)       APPROVAL
    81 (h)       NON-APPROVAL

FIG.18

```
 7  6  5  4  3  2  1  0
┌───┬──────────────────────────┐
│I/O│DESIRE FOR CHANGE  YES/NO │
│   │OF ACCOUNTING RATE        │
└───┴──────────────────────────┘
```

80 (h)       YES
    81 (h)       NO

FIG.19

```
 7  6  5  4  3  2  1  0
┌───┬──────────────────────────┐
│I/O│   CHANGED DESIRED        │
│   │   ACCOUNTING RATE        │
└───┴──────────────────────────┘
```

ORIGINATING USER : RECEIVING USER
    80 (h)          10 : 0
    81 (h)           9 : 1
    82 (h)           8 : 2
    83 (h)           7 : 3
    84 (h)           6 : 4
    85 (h)           5 : 5
    86 (h)           4 : 6
    87 (h)           3 : 7
    88 (h)           2 : 8
    89 (h)           1 : 9
    8A (h)          0 : 10

FIG. 20

| | BIT | 7 6 5 4 3 2 1 0 |
|---|---|---|
| OCTET 1 | | INFORMATION ELEMENT IDENTIFIER |
| OCTET 2 | | INFORMATION ELEMENT CONTENT LENGTH<br>0 0 0 0 0 1 0 0 |
| OCTET 3 | | DESIRED ACCOUNTING RATIO (5:5)<br>1 0 0 0 0 1 0 1 |
| OCTET 4 | | ACCOUNTING RATE APPROVAL/NON-APPROVAL<br>0 0 0 0 0 0 0 0 |
| OCTET 5 | | DESIRE FOR CHANGE OF ACCOUNTING RATE<br>0 0 0 0 0 0 0 0 |
| OCTET 6 | | CHANGED DESIRED ACCOUNTING RATE<br>0 0 0 0 0 0 0 0 |

FIG. 21(a)

| | BIT 7 6 5 4 3 2 1 0 |
|---|---|
| OCTET 1 | INFORMATION ELEMENT IDENTIFIER |
| OCTET 2 | INFORMATION ELEMENT CONTENT LENGTH<br>0 0 0 0 0 1 0 0 |
| OCTET 3 | DESIRED ACCOUNTING RATE<br>0 0 0 0 0 1 0 1 |
| OCTET 4 | ACCOUNTING RATE APPROVAL/NON-APPROVAL<br>1 0 0 0 0 0 0 0 |
| OCTET 5 | DESIRE FOR CHANGE OF ACCOUNTING RATE<br>0 0 0 0 0 0 0 0 |
| OCTET 6 | CHANGED DESIRED ACCOUNTING RATE<br>0 0 0 0 0 0 0 0 |

FIG. 21(b)

| | BIT 7 6 5 4 3 2 1 0 |
|---|---|
| OCTET 1 | INFORMATION ELEMENT IDENTIFIER |
| OCTET 2 | INFORMATION ELEMENT CONTENT LENGTH<br>0 0 0 0 0 1 0 0 |
| OCTET 3 | DESIRED ACCOUNTING RATE<br>0 0 0 0 0 1 0 1 |
| OCTET 4 | ACCOUNTING RATE APPROVAL/NON-APPROVAL<br>1 0 0 0 0 0 0 1 |
| OCTET 5 | DESIRE FOR CHANGE OF ACCOUNTING RATE<br>1 0 0 0 0 0 0 0 |
| OCTET 6 | CHANGED DESIRED ACCOUNTING RATE (7:3)<br>1 0 0 0 0 0 1 1 |

METHOD AND SYSTEM FOR ACCOUNTING COMMUNICATION CHARGES

BACKGROUND OF THE INVENTION

1. Field of the Invention

The present invention relates to an accounting method for sharing charges for services of a communications network with an originating user and/or a receiving user. The communications network to which the present invention is applied is a communications network in which the service charges for the use thereof are imposed and includes any kinds of communications networks such as an analog telephone network and a data communications network like a packet communications network and an ISDN (Integrated Services Digital Network).

2. Description of the Related Art

In recent years, there have been developed data communications services via a data communications network such as a packet communications network and an ISDN. In such data communications services, as in the same way with the communications services via an analog telephone network, there is adopted a "connection-oriented" communications system that a data path is preset before data communications take place. FIG. 32 is a time arrow diagram showing a call setting sequence in this conventional communications system. Note that the network is illustrated in the form of one point in FIG. 32. As a matter of fact, however, this network is constructed of a plurality of switches and trunk lines for relaying these switches in all directions.

Now, the originating terminal transmits a calling message designating a specific receiving terminal to the network. Hereupon, the network selects a proper relay switch and trunk line in accordance with pieces of information on a subscriber's number of the receiving terminal which is contained in the calling message. The network thus sets a communications path (hereinafter simply termed a "path") ranging from the originating terminal to the receiving terminal. Subsequently, the network transfers a call-in message to the receiving terminal via this path and, at the same time, notifies the originating terminal of a fact that the path led to the receiving terminal has been set by sending back a call setting accept message. The receiving terminal sends back a response message to this call-in message to the network. Hereupon, the network sends back a response acknowledgement message to the receiving terminal and, at the same time, transfers a response message to the originating terminal via the set path. With the above sequence, a call is set, whereby the data communications become serviceable.

According to the accounting system of the charges (talk charges) for services of the communications network in the above-mentioned "connection-oriented" communications system, normally, the communications network service charges (talk charges) are calculated based on a quantity of receiving cells on the receiving user, and the charges are imposed on the originating user. Further, in the analog telephone network, there is spread a "collect call service" in which the communications network service charges (talk charges) are imposed on the receiving user with an agreement between the originating and receiving users when setting the call. Moreover, an accounting system wherein the charges are imposed on both of the originating user and the receiving user in accordance with a fixed rate is proposed (see Japanese Patent Laid-Open Publication No.61-146059).

By the way, for instance, if the originating and receiving users offer information exhibiting high added values to each other, it is rational that the (originating and receiving) users themselves flexibly determine a share of burden of the communications network service charges in accordance with a high-and-low balance of the added values of the information offered by each other.

In the conventional accounting system, however, the originating or receiving user is able to only determine which user is burdened with the charges but can not arbitrarily set a sharing rate thereof. Accordingly, the users do nothing but accept the burden of irrational communications network service charges. Note that there is caused such troublesomeness that the communications network service charges have to be cleared off between the users in an ex-post-facto manner. This is a first problem inherent in the conventional accounting system.

Next, in the conventional accounting system, the accounting destination can be determined only when setting the call. Hence, even when there arises a necessity for changing accounting specification (an accounting destination and/or an accounting share) in the middle of the communications, the accounting specification have to be accepted as they are, or the call has to be reset on another occasion after temporarily releasing the call (disconnecting the line). This a second problem inherent in the conventional accounting system. Note that the second problem is conspicuous especially when executing a "call waiting function". More specifically, the call waiting function provided presently as a line switching added service of OSI protocol layer-3 is a function that an in-communications user holds an in-communications call and simultaneously reply to a new call-in when the user receives a call-in notice and, further, make switchable both of the in-communications call and an in-hold call. Then, according to the conventional accounting system, even when a call of the user whom the communication service charges are imposed on (normally, the originating user but the receiving user) when using the collect call services is held due to the call waiting function, the user has to accept the burden of the communications network service charges during the hold due to some convenience of the partner user. This is irrational. Even in this case, the accounting specification can be changed if the call is reset by releasing the call (disconnecting the line). If done so, however, there arises a contradiction that a significance of introducing the call waiting services disappears.

SUMMARY OF THE INVENTION

It is a primary object of the present invention in view of the above first and second problems to provide an accounting method and system capable of arbitrarily changing an accounting specification imposed on an originating user and a receiving user in the middle of communications.

The accounting method and system according to the present invention has been devised under such circumstances. According to one aspect of the present invention, there is provided an accounting system of communication charges for communications between a first terminal and a second terminal connected to each other via a communications network. According to the accounting system, when changing information requesting that an accounting rate between the respective terminals with respect to the communication charges is changed to a given rate is transmitted from one terminal to the communications network in the middle of communications, the communication charges after transmitting the changing information are imposed on one terminal and/or the other terminal in accordance with the given rate.

The terminal includes a telephone, a facsimile, a computer, etc. Particularly when the communications network is a digital communications network, the terminal may be a digital telephone capable of transmitting even video information. Note that one of the first and second terminals is an originating terminal, while the other terminal is a receiving terminal. The originating terminal is a terminal making a call setting request, while the receiving terminal is a partner terminal receiving the call setting request.

The communication charges include line service charges, talk charges, added value service charges, etc.. Further, in connection with a method of calculating the talk charges, if a system for connecting the respective terminals is a constant connection system, the charges may be calculated based on a communications time. If the connection system of the respective terminals involves packet switching, a frame relay or a cell relay, the charges may be calculated based on the number of packets, frames or cells. The request for setting the accounting rate of the communication charges may be accepted when setting the call. That is, the rate of charges may be determined even at the start of communications. If not so, the charges are automatically imposed on the originating terminal and/or the receiving terminal in accordance with a predetermined rate when setting the call. All the communication charges may be imposed on the originating terminal or on the receiving terminal as a variation in terms of the accounting rate. The communication charges may also be imposed on both of the originating terminal and the receiving terminal at a fixed rate. The changing information requesting the change of the accounting rate may be transmitted from either the originating terminal or the receiving terminal but may also be transmitted from only the originating terminal or the receiving terminal. Further, in the communications service added with the call waiting function, the request for holding the call can be conceived as a piece of information requesting the change of the accounting rate. In this case, all the charges can be always imposed on the terminal making the request for holding the call. When the changing information requesting the change of the accounting rate is transmitted from one terminal to the communications network, the charges may be imposed at all times in accordance with a rate contained in the changing information. Alternatively, after notifying the other terminal of the rate, and only when the other terminal agrees to this rate, the charges may also be imposed thereon in accordance with the rate. In the latter case, if the other terminal does not agree to the relevant rate, and when the other terminal transmits an item of information requesting a change to a different rate, the charges may be imposed based on the rate contained in the information transmitted by the other terminal. Note that this different rate is termed a modified rate.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a diagram illustrating a structure of a call setting (SETUP) message in FIG. 6;

FIG. 8 is a diagram illustrating a structure of a response (CONN) message in FIG. 6;

FIG. 10 is a diagram showing a structure of an information (INFO) message in FIG. 6;

FIG. 11 is a diagram illustrating a structure of a HOLD (hold) message in FIG. 6;

FIG. 12 is a diagram illustrating a structure of a hold acknowledgement (HOLD ACK) message in FIG. 6;

FIG. 13 is a diagram showing a structure of a retrieve (RETRIEVE) message in FIG. 6;

FIG. 14 is a diagram showing a structure of a retrieve acknowledgement message in FIG. 6;

FIG. 17 is an explanatory diagram of an octet 4 in FIG. 15;

FIG. 18 is an explanatory diagram of an octet 5 in FIG. 15;

FIG. 19 is an explanatory diagram of an octet 6 in FIG. 15;

FIG. 20 is a diagram showing a specific example of the accounting rate information element of FIG. 15 in the call setting message;

FIG. 21 is a diagram showing a specific example of the accounting rate information element in FIG. 15 in a response message;

FIG. 21(a) is a diagram in the case of an approval; FIG. 21(b) is a diagram in the case of a non-approval;

DESCRIPTION OF THE PREFERRED EMBODIMENT

First Embodiment

Figure 1:
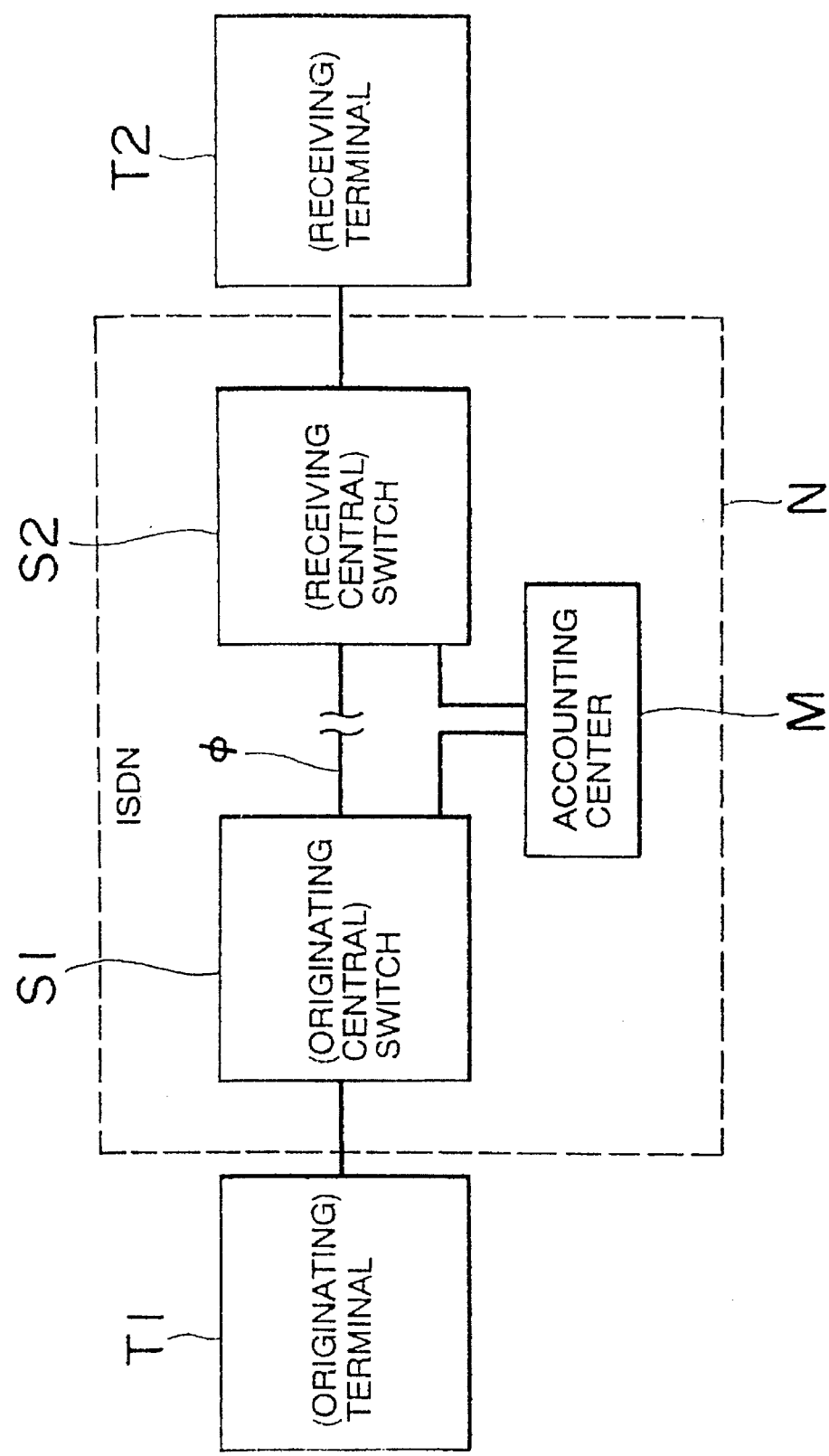
FIG. 1 is a schematic view illustrating a communications system in which an accounting system in one embodiment of the present invention is carried out.

One embodiment of the present invention will be discussed with reference to the drawings. FIG. 1 is a schematic view illustrating a communications system in which an accounting system in one embodiment of this invention is put into operation. As illustrated in FIG. 1, according to this communications system, a plurality of terminal T are connected to each other via a single ISDN (N). Referring again to FIG. 1, for an explanatory convenience, only two terminals T are shown therein. One terminal is conceived as an originating terminal T1, while the other terminal is conceived as a receiving terminal T2. These terminals T are concretely digital telephones capable of transmitting and receiving video signals and a variety of digital signals as well as voice signals. The ISDN (N) is defined as a B-ISDN (Broad-Band Integrated Services Digital Network). This ISDN (N) is constructed of a plurality of switches S connected to each other via trunk lines φ and an accounting center M connected to all these switches S. For the explanatory convenience, however, FIG. 1 shows only two units of switches S. The switch connected to the originating terminal T1 is termed an originating station switch S1. The switch connected to the receiving terminal T2 is termed a receiving central switch S2. Note that a plurality of terminal T are normally connected to each switch S, but, for the explanatory convenience in FIG. 1, the illustration is such that only the single terminal T is connected thereto. The trunk line φ and a connecting line for connecting each switch S and the terminal T is optical cable.

Figure 2:
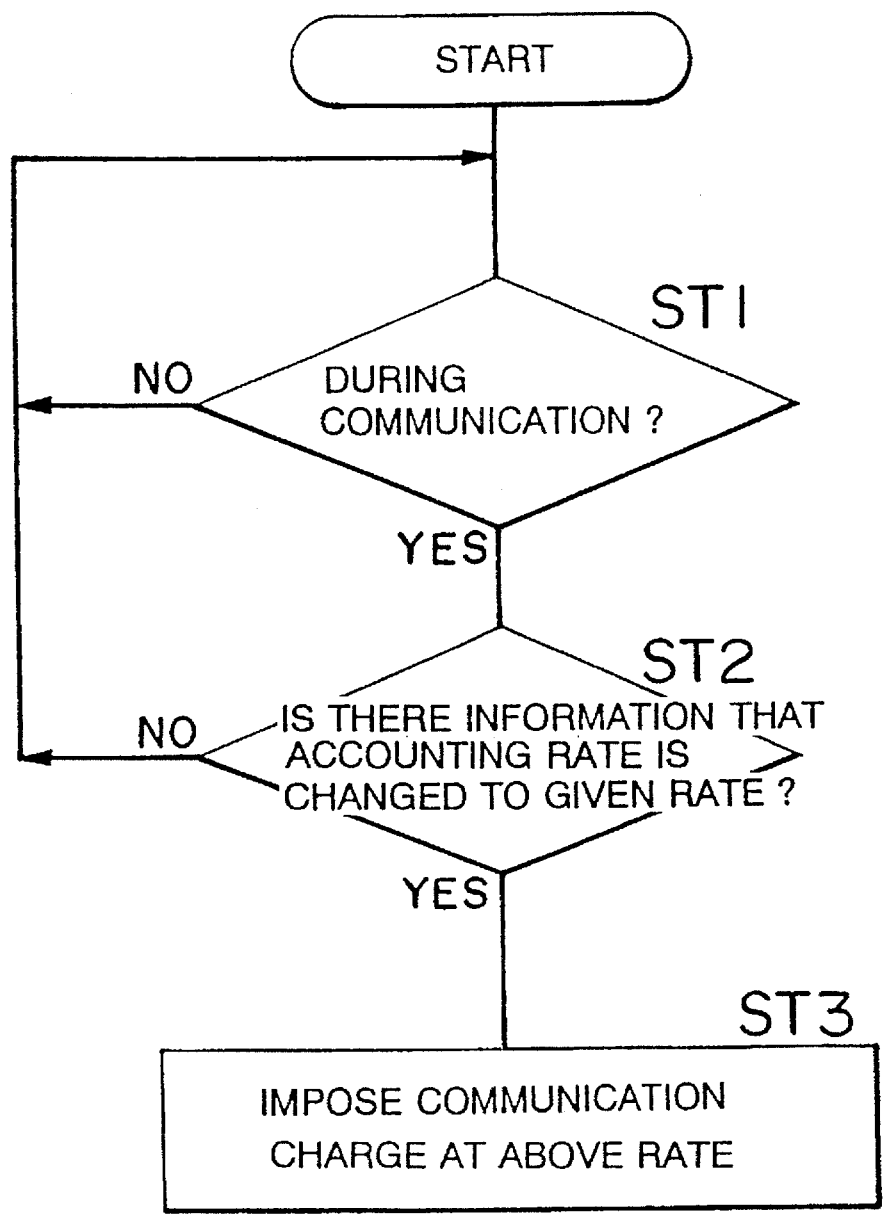
FIG. 2 is a flowchart showing an outline of processing carried out in the communications system of FIG. 1.

FIG. 2 shows an outline of the accounting system in accordance with this embodiment carried out in the communications system having the above schematic construction. To be specific, a communication charge for the relevant call is imposed on the originating terminal T1 and/or receiving terminal T2 in accordance with a rate determined when setting the call by some means. In the middle of the communications by this call (step ST1), one terminal described above transmits, to the communications network, a piece of changing information requesting that an accounting rate of the communication charge between the respective terminals is changed to a given rate (step ST2). Then, the communications network imposes the communication charge after the above information has been transmitted upon one terminal and/or the other terminal in accordance with the given rate (step ST3).

The following is a detailed explanation of the respective constructive elements constituting the communications system.

Figure 3:
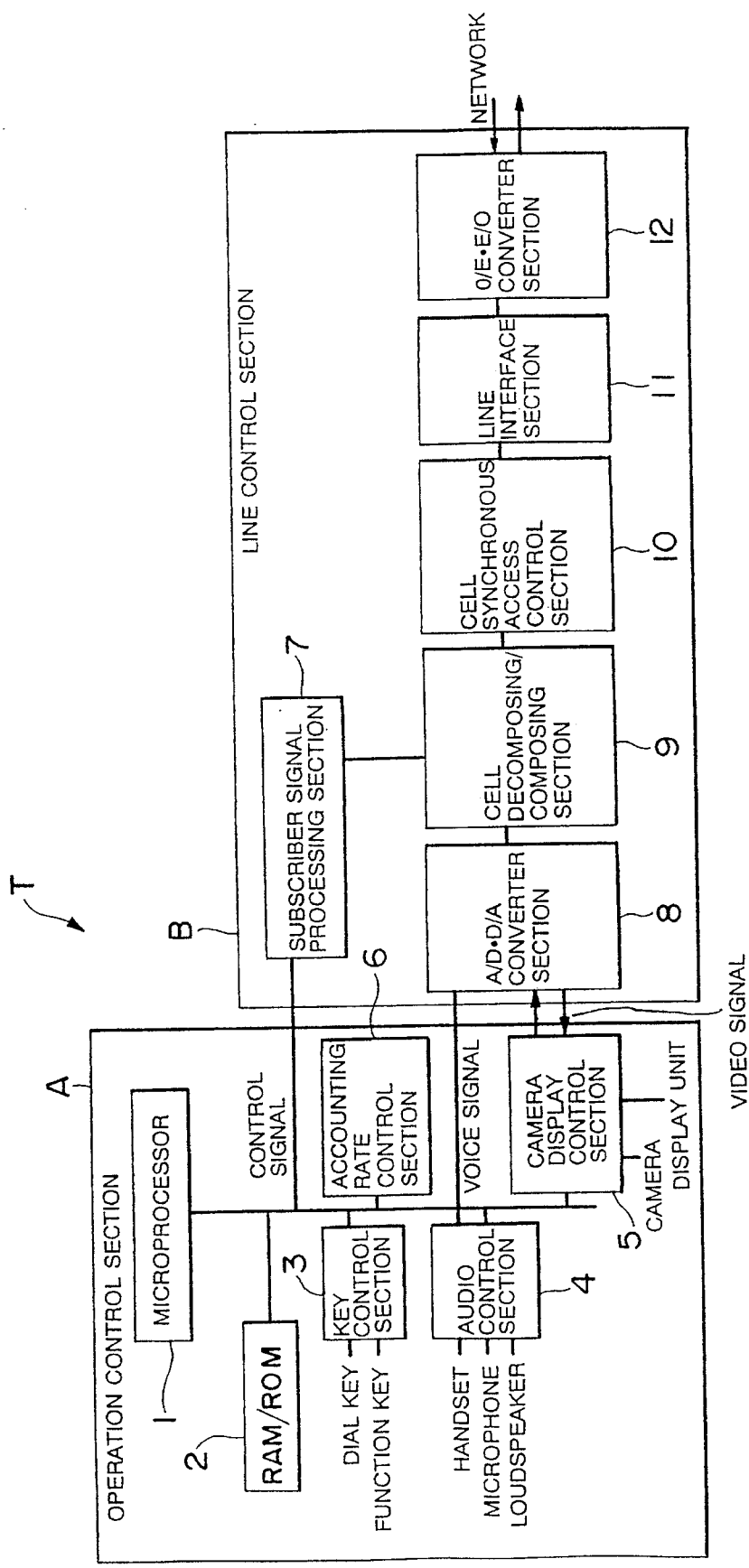
FIG. 3 is a block diagram showing details of a terminal in FIG. 2.

FIG. 3 illustrates details of a configuration of each terminal T. As obvious from FIG. 3, each terminal T comprises an operation control section A and a line control section B. This operation control section A is a man-to-machine interface. This operation control section A presents a various items of information to the operator, and, at the same time, receives inputting of the various items of information from the operator. Further, the line control section B processes respective signals received from the operation control section A into cells according to an ATM (Asynchronous Transfer Mode) system. The line control section B then transmits the cells to the ISDN (N). Simultaneously, the line control section B decomposes and restores the cells transmitted from the ISDN (N) into the original signal form. The line control section B then transfers the original-form signals to the operation control section A. Note that the ATM system defined as a communications mode employed for the B-ISDN decomposes all items of communications information which have different bands into cells having a fixed length of 53 octets, transfers these cells in a transmission path and performs switching through hardware.

The operation control section A is constructed of a microprocessor 1, a RAM/ROM 2, a key control section 3, an audio control section 4, a camera/display control section 5 and an accounting rate control section 6 which are respectively connected via a bus to the microprocessor 1.

The microprocessor 1 is a processing section for controlling the whole operation control section A.

The RAM/ROM 2 stores a program for executing the control in the microprocessor 1 and a various items of data for effecting this control.

Dial keys and functions keys are connected to the key control section 3. This key control section 3 is an interface for converting signal inputted through those keys into digital signals and inputting these digital signals to the microprocessor 1.

Connected to the audio control section 4 are a receiver (a handset), an outside microphone and a loudspeaker. This audio control section 4 sound-outputs the audio signals (normally talking voices) transmitted from the line control section B through the handset or the loudspeaker in accordance with the control of the microprocessor 1. The audio control section 4 also serves as a voice interface for transmitting the audio signals (normally the talking voices) inputted from the handset and the microphone to the line control section B in accordance with the control of the microprocessor 1.

A camera and a display unit are connected to the camera/display control section 5. This camera/display control section 5 is a video interface for displaying a video (normally, a motion picture of face of a user talking with the operator) signal transmitted from the line control section B and, at the same time, transmitting a video (normally, a motion picture of face of the operator) signal inputted from the camera to the line control section B under the control of the microprocessor 1.

The accounting rate control section 6 is a processing section for executing a variety of processes associated with the accounting control.

The line control section B comprises a subscriber signal processing section 7 connected to the microprocessor 1 of the operation control section A and an A/D,D/A converter 8 connected to the camera/display control section 5 as well as to the audio control section 4 of the operation control section A. The line control section B also comprises a cell decomposing/composing section 9 connected to the subscriber signal processing section 7 and the A/D·D/A converter 8 and a cell synchronous access control section 10 connected to the cell decomposing/composing section 9. The line control section B further comprises a line interface section 11 connected to the cell synchronous access control section 10 and an O/E,E/O converting section 12 connected to the line interface section 11 and the network N.

The subscriber signal processing section 7 receives a control signal generated by the microprocessor 1 in accordance with key inputting through the key control section 3 and the data stored in the RAM/ROM 2. The subscriber signal processing section 7 adds subscriber data such as a receiving number (a subscriber's number), etc. to this control signal and thus effects processing the signal into a form suited to compose the cell. On the other hand, the subscriber signal processing section 7 receives data signals exclusive of the video and voice signals contained in the cell transmitted from the cell decomposing/composing section 9. The subscriber signal processing section 7 processes this item of data into a form suitable for inputting to the microprocessor 1 and transmits it as a control signal to the microprocessor 1.

The A/D (analog/digital)·D/A (digital/analog) converter 8 A/D-converts analog audio signals transmitted from the audio control section 4 and analog video signals transmitted from the camera/display control section 5. The converter 8 then inputs the A/D-converted signals to the sell decomposing/decomposing section 9. On the other hand, the A/D·D/A converter 8 D/A-converts the digital audio signals transmitted from the cell decomposing/composing section 9 and inputs the D/A-converted signals to the audio control section 4. At the same time, the converter 8 D/A-converts the digital video signals transmitted from the cell decomposing/composing section 9 and inputs the D/A-converted signals to the camera/display control section 5.

The cell decomposing/composing section 9 decomposes the control signal transmitted from the subscriber signal processing section 7 and audio/video signals transmitted from the A/D·D/A converter 8 and composes them into the cell. The cell decomposing/composing section 9 then transmits this cell to the cell synchronous access control section 10. On the other hand, the cell decomposing/composing section 9 decomposes the cell transmitted from the cell synchronous access control section 10 and relinks the signals delinked per cell, thus restoring them to the control signal and the digital audio/video signals. Then, the cell decomposing/composing section 9 transmits the thus restored control signal to the subscriber signal processing section 7 and the digital audio/video signals to the A/D·D/A converter 8.

The cell synchronous access control section 10 adds a cell frame signal to the cell transmitted from the cell decomposing/composing section 9 and performs processing to synchronize a head of the cell with this cell frame signal. Subsequently, the cell synchronous access control section 10 transfers the cell to the line interface section 11. The cell synchronous access control section 10 also transfers the cell transmitted from the line interface section 11 to the cell decomposing/composing section 9.

The line interface section 11 is an interface for connecting the cell synchronous access control section 10 to the ISDN (N).

An O/E (opto-electric)·E/O (electro-optic) converter section 12 converts the electric signals forming the cell transmitted from the line interface section 11 into optical signals to be transmitted via an optical cable to the network N. On the other hand, the O/E·E/O converter section 12 converts the optical signals forming the cell transmitted from the network N via the optical cable into the electric signals to be inputted to the line interface section 11.

Figure 4:
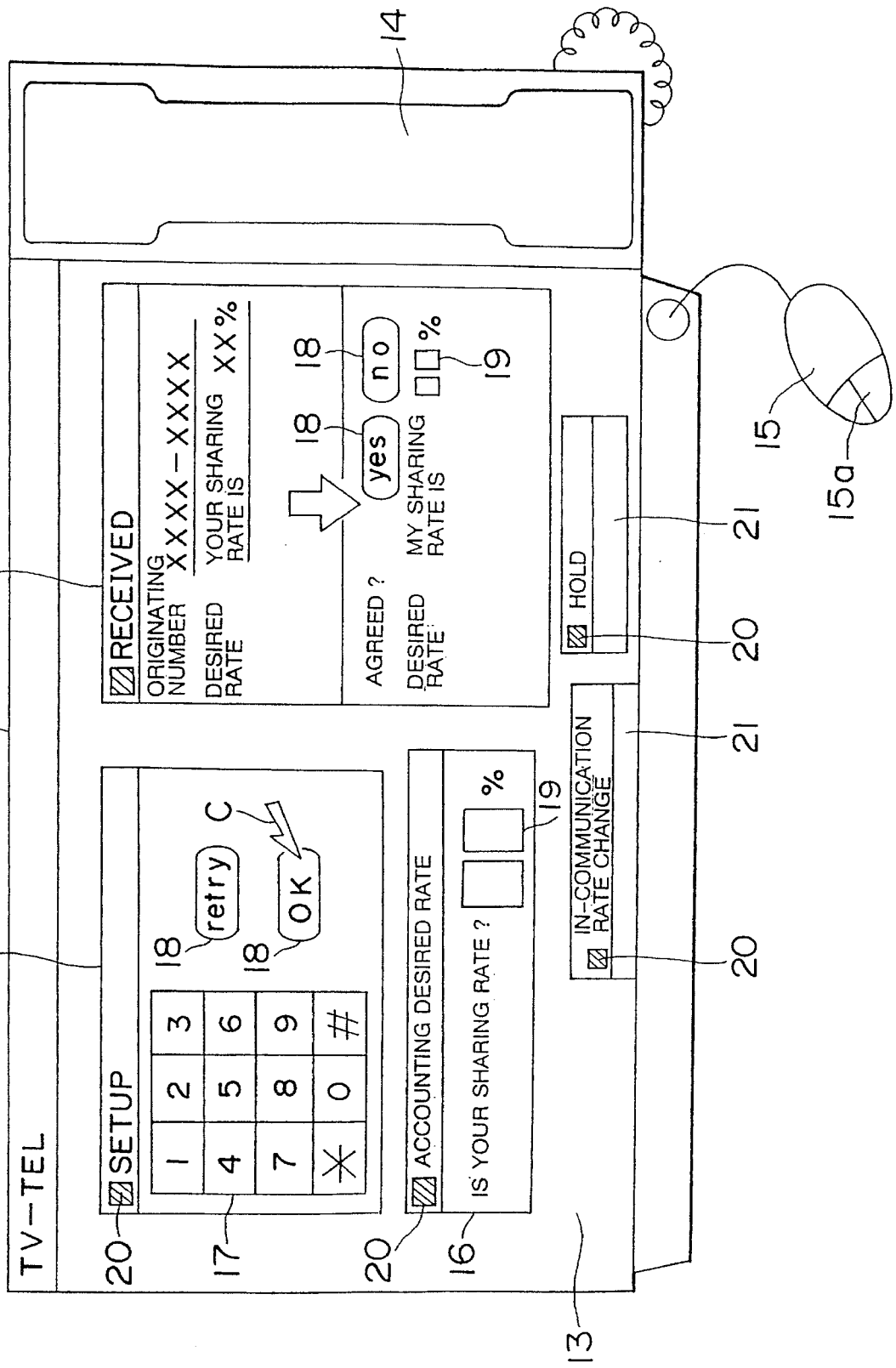
FIG. 4 is a sketch diagram of the terminal in FIG.

FIG. 4 is a sketch diagram of the terminal T having the above construction. As is apparent from FIG. 4, a display screen 13 and a receiver (a handset) 14 are disposed on the front surface of the terminal T. Note that in this example of FIG. 4, a mouse 15 is employed by way of the dial keys and the functions keys explained in FIG. 3. Further, windows 16 of items necessary for the operation are displayed on the screen 13. Displayed in the windows of the respective items are a dial key portion 17 (in the case of a SETUP window), a function key portion 18 (in the case of the SETUP window and a RECEIVED window) and a numeral selecting portion 19 (in the case of the RECEIVED window and an ACCOUNTING DESIRED RATE window). The operator moves a cursor (C) on an item which is to be inputted among these portions such as a key portion, etc. by use of the mouse 15. The operator depresses a click switch 15a provided on the mouse 15. In this manner, the same input operation with a push button type keyboard is attainable. Note that the RECEIVED window and a HOLD window are automatically opened when receiving a call-in message from the ISDN (N). With respect to other windows 16, a control box 20 displayed at a left upper corner of each window 16 is clicked, whereby the window 16 can be freely opened or iconized (21). Input control thereof is performed by the key control section 3.

A facial video of the speaking partner user who makes a speech transmitted from the ISDN (N) is displayed normally on a background on the screen 13. Even when opening each window 16 also, the facial video of the speaking partner user is displayed on the background.

Figure 5:
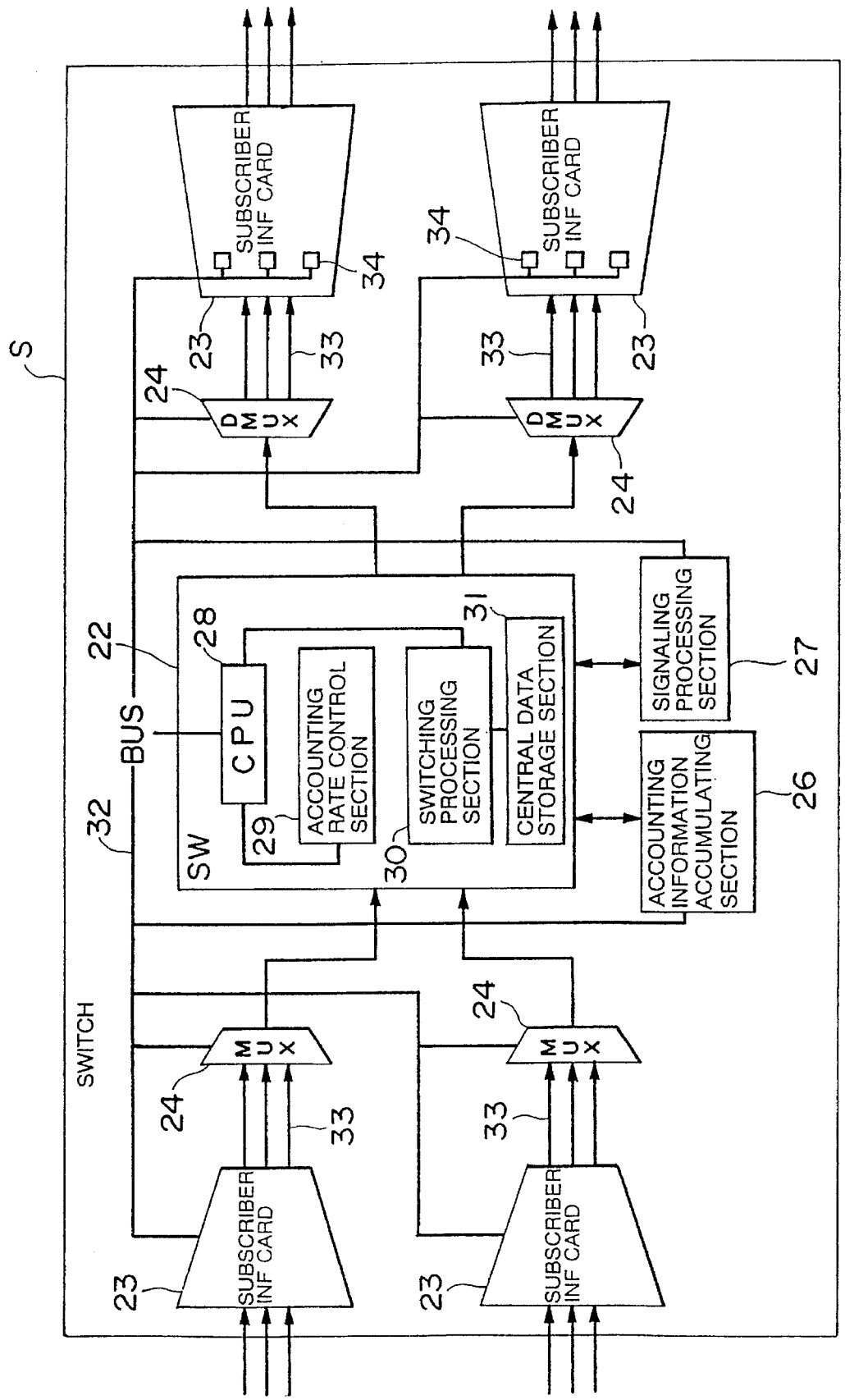
FIG. 5 is a block diagram showing details of a switch in FIG. 2.

FIG. 5 illustrates a construction of the switch S. As obvious from FIG. 5, the switch S is constructed of a switch body 22 incorporating a CPU 28, a subscriber interface card 23, a multiplexing/demultiplexing device 24, an accounting information accumulating section 26 and a signaling processing section 27 controlled through a system bus (shown by a bold line in FIG. 5) 32 by the CPU 28.

The subscriber interface card 23 is an interface for converting, into the electric signals, the cell transmitted from the respective terminals T or other switches S in the form of the optical signals. Note that the subscriber interface card 23 connected to the terminal T incorporates a receiving cell counter 34 for counting the number of receiving cells when the terminal T turns out to be a receiving terminal T2.

The multiplexing/demultiplexing device 24 effects time-division-multiplexing on the plurality of cells transmitted in parallel from the subscriber interface card 23 via a plurality of data lines (shown by thin lines in FIG. 5) 33. The multiplexing/demultiplexing device 24 then inputs the thus multiplexed cells to the switch body 22. On the other hand, the multiplexing/demultiplexing device 24 individually demultiplexes the plurality of cells transmitted from the switch body 22 in the multiplexed status. The multiplexing/demultiplexing device 24 transmits the thus demultiplexed cells through the plurality of data lines 33 and inputs the cells to the subscriber interface card 23.

The signaling processing section 27 performs processing to set a path in response to a call setting request.

The switch body 22 comprises the CPU 28, an accounting rate control section 29 and a switching processing section 30, respectively controlled by this CPU 2, and a central data storage section 31 connected to the switching processing section 30.

The CPU 28 is a processing section for controlling the operation of this switch S as a whole. 20 The accounting rate control section 29 is a control section for controlling accounting specification (an accounting destination and an accounting rate) for every call in accordance with an instruction from the user who occupies the terminal T.

The central data storage section 31 stores station data about characteristics or the like of each subscriber interface 23.

The switching processing section 30 conducts switching to transfer the cell to a proper subscriber interface 23 in accordance with the data stored in the central data storage section 31 as well as address information of the cell inputted to the switch body 22.

Note that the accounting information accumulating section 26 is conceived as a memory for accumulating the accounting information in accordance with the number of the receiving cells counted by the receiving cell counter 34 and the accounting specification determined by the processing of the accounting rate control section 29.

Figure 6:
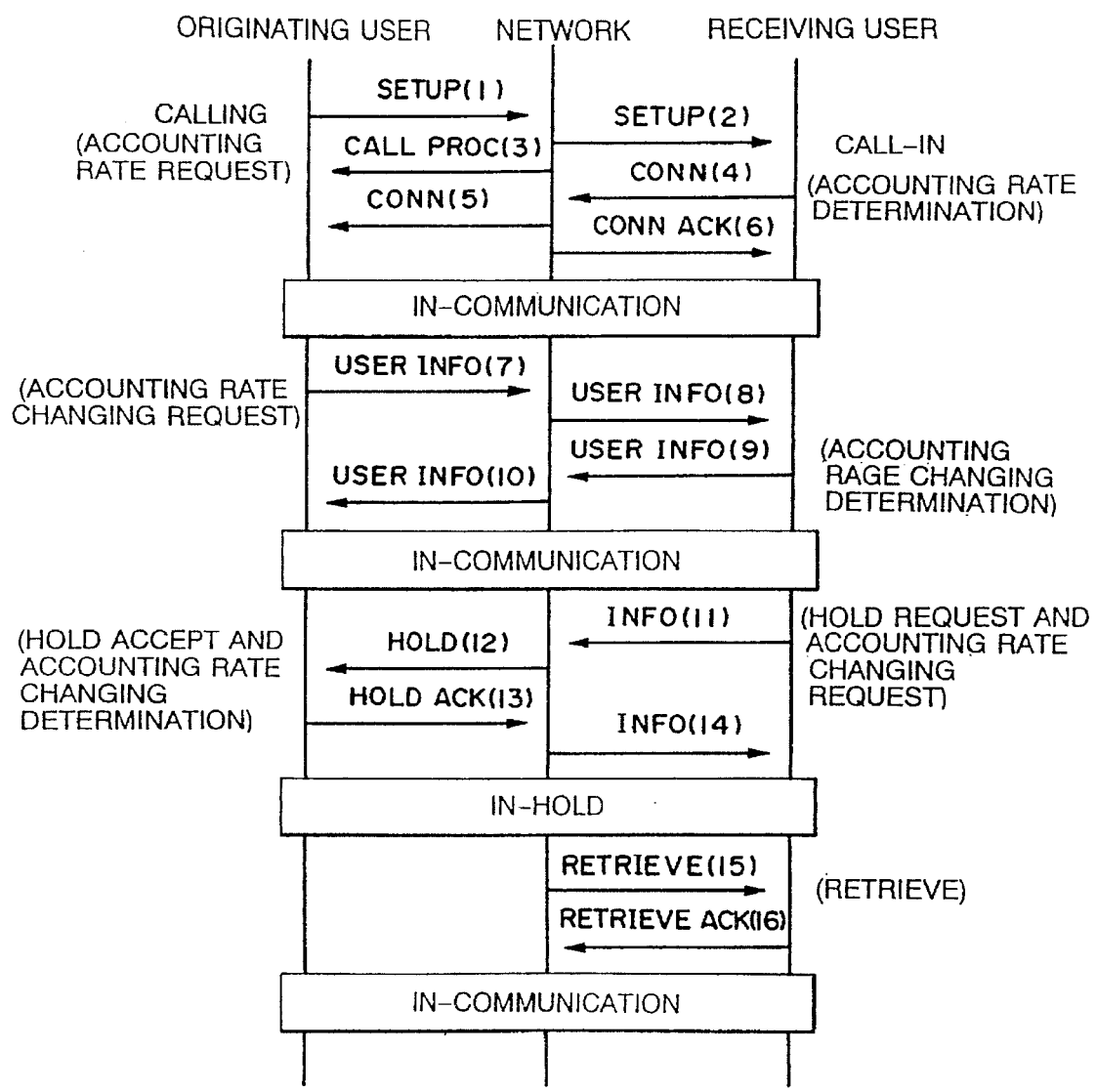
FIG. 6 is a time arrow diagram showing an outline of a sequence of the accounting system in one embodiment of this invention.

Given next is an explanation of the details of the accounting control executed in the above-described communications system. FIG. 6 is a time arrow chart showing an outline of sequence of this accounting control.

First, the originating user opens the "ACCOUNTING DESIRED RATE" window on the screen 13 of the originating terminal T1. The originating user then inputs a desired accounting rate through the mouse 15 (incidentally, when desiring the ordinary accounting, the user does not open the "ACCOUNTING DESIRED RATE" window 16). Subsequently, the originating user opens the "SETUP" window 16 and inputs a subscriber's number of the receiving terminal T2 by use of the mouse 15. After the operations described above, the originating user raises the handset and clicks the function key portion 18 of "OK" in the "SETUP" window 16 trough the mouse 15. Hereupon, a call setting (SETUP) message is transmitted from the originating terminal T1 to the ISDN (N) (1).

FIG. 7 illustrates a structure of this call setting message. This call setting message is pursuant to the "TTC Standard User/Network Interface Signal", the first separate volume (No.3) of Vol. 2, and, therefore, an explanation of each item in the message will be omitted. In this embodiment, however, information on an "accounting rate information element" is added as a piece of added information to the structure pursuant to the "TTC Standard User/Network Interface Signal", the first separate volume (No.3) of Vol. 2.

Figure 15:
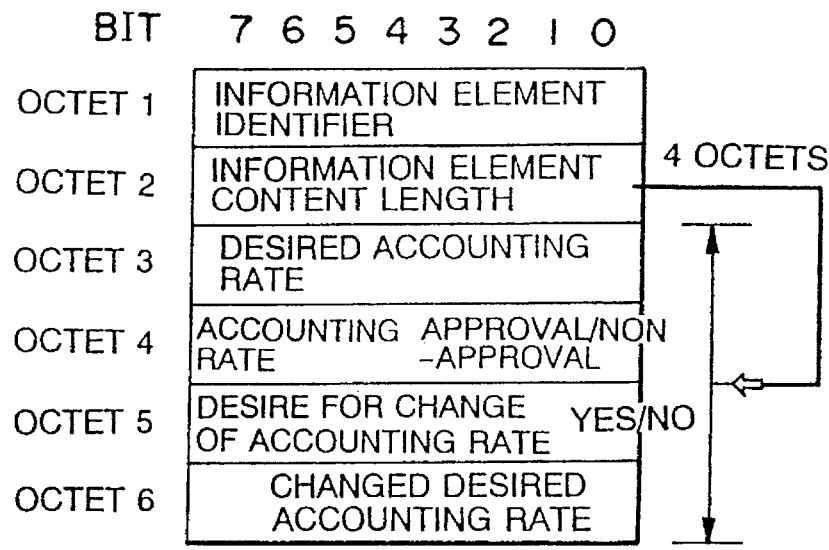
FIG. 15 is a diagram showing a structure of an accounting rate information element in FIGS. 7 to 10.

FIG. 15 shows a structure of this "accounting rate information element". As apparent from FIG. 15, this "accounting rate information element" consists of 6-octet data. Hereinbelow, this 6-octet data will be explained in sequence from the head thereof.

To start with, the octet 1 is defined as an information element identifier. That is, the data subsequent to this identifier gives an indication of being the "accounting rate information element".

Next, the octet 2 is an item of data of an information element content length. Namely, this item of data indicates an information range of the "accounting rate information element". To be specific, the octet 2 indicates the number of octets after the next octet (the octet 3) inclusive (that is, 4 octets).

Figure 16:
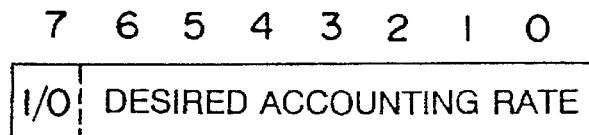
FIG. 16 is an explanatory diagram of an octet 3 in FIG. 15.

Next, the octet 3 is an item of data of the desired accounting rate. Specifically, as shown in FIG. 16, a 7th bit of this item of data indicates whether the present octet information is valid ("1") or invalid ("0"). Then, bits from a 0th bit to a 6th bit indicate a desired accounting rate. Each of these numerals corresponds to the accounting rate between the original user and the receiving user as shown in FIG. 16. With the above-mentioned, if the originating user does not input the "accounting desired rate", the 7th bit becomes "0". Whereas if the originating user inputs the "accounting desired rate", the 7th bit is "1", and specific numeric values are set in the 0th bit through the 6th bit.

Note that the accounting rate information is expressed by seven bits, and hence its permutation is prepared in 101 ways. Accordingly, percentages themselves may be stored as the accounting rate information.

Next, the octet 4 is an item of data about approval/non-approval of the accounting rate. To be specific, as shown in FIG. 17, the 7th bit of this item of data indicates whether the present octet information is valid ("1") or invalid ("0"). Hence, the 7th bit is "0" in a status of being added to the call setting message. The 0th bit through 6th bit indicate the approval/non-approval. Each of these numerals corresponds to the indication of whether the accounting rate presented is approved or not.

Next, the octet 5 is an item of data showing whether change of the accounting rate is desired or not. Specifically, as shown in FIG. 18, the 7th bit of this item of data indicates the present octet information is valid ("1") or invalid ("0"). Accordingly, the 7th bit is "0" in a status where this data is added to the call setting message. The 0th bit through 6th bit indicate whether change in the accounting rate is desired or not. That is, each of the numerals expressed by these bits corresponds to the indication of whether the change of the accounting rate is desired (Yes) or undesired (No).

Next, the octet 6 is an item of data about the accounting rate which is desired to be changed (a change desired accounting rate). That is, as shown in FIG. 19, the 7th bit of this item of data indicates whether the present octet information is valid ("1") or invalid ("0"). Accordingly, the 7th bit is "0" in the status where this data is added to the call setting message. The 0th bit through the 6th bit indicates the change desired accounting rate. This numeral, as in the same way with FIG. 16, corresponds to the accounting rate between the originating user and the receiving user. Note that the change desired accounting rate information is expressed by the seven bits, and, therefore, its permutation is prepared in 101 ways. Accordingly, the percentages themselves may be stored as the accounting rate information.

FIG. 20 illustrates an example of the setting status of the "accounting rate information element" in the call setting message. An information element content length of the octet 2 is 4. Further, a desired accounting rate of the octet 3 is set to 5:5. Note that, as stated above, the 7th bits of the octets 4–6 in this status are "0" (invalid).

Referring back to FIG. 6, the call setting message (1) transmitted to the ISDN (N) is transferred directly to the receiving terminal T2 (2). Then, a calling sound is emitted from the receiving terminal-T2, and, at the same time, the "RECEIVED" window 16 is opened on the display screen 13 of the receiving terminal T2. Subsequently, a subscribers's number of the originating terminal S1 and a rate (percentage) of the charge with which the receiving user is burdened are displayed in this "RECEIVED" window 16. This accounting rate is displayed based on the accounting rates stored in the "accounting rate information element". Note that after transferring the call setting message to the receiving terminal T2, the ISDN (N) transmits a call setting accept (CALL PROC) message to the originating terminal T1 (3).

When the receiving user is aware of the call-in and agrees to an accounting burden rate presented from the originating user, the receiving user inputs (clicks) the function key portion 18 of "YES" in the "RECEIVED" window 16 through the mouse 15 and, at the same time, raises the handset 14.

Further, if the receiving user does not agree to the accounting burden rate presented by the originating user but desires talking therewith, the receiving user operates the numeral input portion 19 in the "RECEIVED" window 16 by use of the mouse 15 and inputs an accounting burden rate desired by the receiving user. In the initial state, 00% is set in this numeral input portion 19. Accordingly, if the receiving user absolutely rejects the accounting burden, nothing is inputted. Thereafter, the handset is raised.

Further, if the receiving user does not desire the talk because the receiving user does not want to accept the accounting rate of the originating user, the receiving user inputs (clicks) the function key portion 18 of "NO" in the "RECEIVED" window 16 through the mouse 15.

When the receiving user raises the handset 14, a response (CONN) message is transmitted from the receiving terminal T2 to the ISDN (N) (4).

FIG. 8 illustrates a structure of this response message. This response message is also pursuant to the above-mentioned "TTC Standard User/Network Interface Signal", the first separate volume (No.3) of Vol. 2, and, therefore the explanation of each item in the message will be omitted. In this embodiment, however, the information on the "accounting rate information element" is added as a piece of added information to the structure pursuant to the "TTC Standard User/Network Interface Signal", the first separate volume (No.3) of Vol. 2. This "accounting rate information element" is transferred from the call setting message (2).

And, the contents of this "accounting rate information element" are rewritten depending on inputting or non-inputting by the receiving user. That is, when the receiving user inputs the function key portion 18 of "YES", as in an example shown in FIG. 21(*a*), the 7th bit of the octet 4 is rewritten into "1 (valid)". Note that all bits other than the 7th bit of the octet 4 are "0" and therefore indicate the "approval".

In contrast with this, when the receiving user inputs a self-desired accounting burden ratio, as in an example shown in FIG. 21(*b*), the 7th bit of the octet 4 is rewritten into "1 (valid)", while the 0th bit is rewritten into "1 (non-approval)". Further, the 7th bit of the octet 5 is rewritten into "1 (valid)". Note that all the bits exclusive of the 7th bit of the octet 5 are "0" and hence represent a "desire for changing the accounting rate". Moreover, the 7th bit of the octet 6 is rewritten into "1 (valid)". Note that the whole bits of the octet 6 is rewritten into "10000011" to indicate an accounting burden ratio of "7:3" inputted by the receiving user.

Referring back to FIG. 6, when the response message (4) is transmitted, the ISDN (N) transfers this response message to the originating terminal T1 (5). This response message is transmitted to the originating terminal T1, thereby setting a call between the originating terminal T1 and the receiving terminal T2. The communications between the two users can be effected based on the determined accounting specification. Incidentally, after the response message has been transferred (5) to the originating terminal T1, the ISDN (N) transmits a response acknowledgement (CONN ACK) to the receiving terminal T2 (6).

If one of the users desires for changing the accounting specification during the talk, the user opens an "IN-TALK RATE CHANGE" window 16 and an "ACCOUNTING DESIRED RATE" window 16 on the screen of the terminal T and inputs a desired accounting rate through the mouse 15. Then, a user information (USER INFO) message is transmitted from the relevant terminal T to the ISDN (N) (7).

Figure 9:
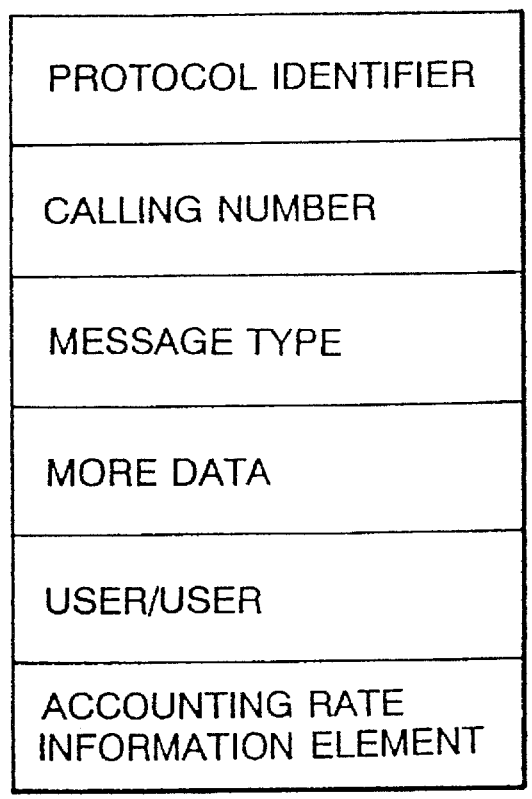
FIG. 9 is a diagram showing a structure of a user information (USER INFO) message in FIG. 6.

FIG. 9 illustrates a structure of this user information message. This user information message is pursuant to the "TTC Standard User/Network Interface Signal", the first separate volume (No.3) of Vol. 2, and, therefore, an explanation of each item in the message will be omitted. In this embodiment, however, the information on the "accounting rate information element" is added as a piece of added information to the structure pursuant to the above "TTC Standard User/Network Interface Signal", the first separate volume (No.3) of Vol. 2. Written contents of the "accounting rate information element" in this instance are the same as those of the call setting message, and hence the explanation thereof will be omitted.

Turning back to FIG. 6, the user information message (7) transmitted to the ISDN (N) is transferred directly to the terminal T of the partner user (8). Then, the "RECEIVED" window 16 is opened on the display screen 13 of the terminal T of the partner user. Subsequently, an accounting burden rate (percentage) with which the partner user would be burdened is displayed in this "RECEIVED" window 16. This accounting rate is displayed based on the accounting rates stored in the "accounting rate information element".

If the partner user agrees to the accounting burden rate presented, the partner user inputs (clicks) the function key portion 18 of "YES" in the "RECEIVED" window 16 through the mouse 15. Further, if the partner user desires an accounting burden rate different from the presented one, the partner user inputs a desired accounting burden rate by operating the numeral input portion 19 in the "RECEIVED" window 16 by using the mouse 15. Incidentally, if this partner user does not agree to a change in the accounting burden rate, nothing is inputted.

When the partner user inputs one of the items, the user information message is sent back to the ISDN (N) (9). The "accounting rate information element" of this user information message is, however, rewritten as in the same way with the explanation given in FIG. 21, depending on inputting or non-inputting by this partner user.

The ISDN (N) transfers this user information message to the terminal T of the user requesting the change in the accounting specification (10). This transferred user information message is received by the terminal, thereby determining the change in the accounting specification. Then, the talk is allowed to resume.

If other unillustrated terminal gives a call to the receiving terminal T2 during the talk, the receiving user pushes down a hook of the handset 14. Then, an information (INFO) message is transmitted from the receiving terminal T2 to the ISDN (N) (11).

FIG. 10 illustrates a structure of this information message. This information message is pursuant to the "TTC Standard User/Network Interface Signal", the first separate volume (No.3) of Vol. 2, and, therefore, an explanation of each item in the message will be omitted. In this embodiment, however, the information on the "accounting rate information element" is added as a piece of added information to the structure pursuant to the "TTC Standard User/Network Interface Signal", the first separate volume (No.3) of Vol. 2. The written contents of the "accounting rate information element" in this instance are the same as those of the call setting message (1), and hence the explanation thereof will be omitted. The desired accounting rate of the octet 3 of the "accounting rate information element" is automatically set so that the receiving user is burdened with 100% of the charge.

Referring back to FIG. 6, the ISDN (N) receiving the information message transmits a hold (HOLD) message to the originating terminal T1 (12). FIG. 11 shows a structure of this hold message. This hold message is also pursuant to the "TTC Standard User/Network Interface Signal", the first separate volume (No.3) of Vol. 2, and, therefore, an explanation of each item in the message will be omitted.

When the originating terminal T1 receives this hold message (12), a "HOLD" window 16 is opened on the display screen 13 thereof. Then, this "HOLD" window displays that an accounting rate (percentage) with which the originating user is burdened is 0%. Note that this "HOLD" window 16 is, though not illustrated, provided with a function key portion for inputting an approval (YES) or non-approval (NO) of the change of the accounting rate change.

If the originating user agrees to the change of the accounting rate, the originating user inputs (clicks) the function key portion of "YES" in the "HOLD" window 16 through the mouse 15. Whereas if the originating user does not agree to the change in the accounting rate, the originating user inputs (clicks) the function key portion of "NO" in the "HOLD" window 16.

When the originating user inputs the above function key, a hold acknowledgement (HOLD ACK) message is transmitted to the ISDN (N) (13). FIG. 12 illustrates a structure of this hold acknowledgement message. This information message is also pursuant to the "TTC Standard User/Network Interface Signal", the first separate volume (No.3) of Vol. 2, and, therefore, an explanation of each item in the message will be omitted. In this embodiment, however, information on the "accounting changeover information element" is added as a piece of added information to the structure pursuant to the "TTC Standard User/Network Interface Signal", the first separate volume (No.3) of Vol. 2.

Figure 22:
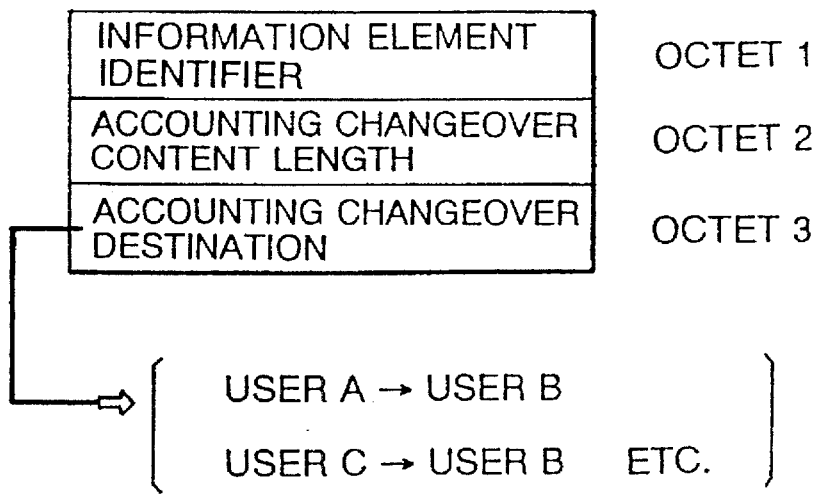
FIG. 22 is a diagram illustrating a structure of an accounting changeover information element in FIGS. 12 to 14.

FIG. 22 shows a structure of this "accounting changeover information element". As apparent from FIG. 22, this "accounting changeover information element" consists of 3-octet data. Hereinbelow, this 3-octet data will be explained in sequence from the head thereof.

The octet 1 is defined as an information element identifier. That is, the data subsequent to this identifier gives an indication of being the "accounting changeover information element".

The octet 2 is an item of data of an information element content length. Namely, this item of data indicates an information range of the "accounting changeover information element". To be specific, this data indicates the number of octets after the next octet (octet 3) inclusive (that is, one octet).

The octet 3 is an item of data about an accounting changeover destination. Specifically, as shown in FIG. 22, the data is stored in the form of 2-byte numerals, this data giving an indication that the accounting destination is to be switched from one user to another user.

Referring back to FIG. 6, the ISDN (N) receiving the hold acknowledgement message (13) changes over the accounting destination in accordance with the information on the accounting changeover destination in the hold acknowledgement message. Simultaneously, the ISDN (N) transmits the information (INFO) message to the receiving terminal T2 (14). With the above operations, the call from the originating terminal T1 is held, and a call from other unillustrated terminal is set.

If the receiving user holds or cuts off the call from other unillustrated terminal, the ISDN (N) transmits a retrieve (RETRIEVE) message to the receiving terminal T2 (15). FIG. 13 shows a structure of this retrieve message. This retrieve message is also pursuant to the "TTC Standard User/Network Interface Signal", the first separate volume (No.3) of Vol. 2, and, therefore, an explanation of each item in the message will be omitted.

The receiving terminal T2 receiving this retrieve message (15) sends back a retrieve acknowledgement (RETRIEVE ACK) message to the ISDN (N) (16). FIG. 14 shows a structure of this retrieve message. This information message is also pursuant to the "TTC Standard User/Network Interface Signal", the first separate volume (No.3) of Vol. 2, and, therefore the explanation of each item in the message will be omitted. In this embodiment, however, the information on the "accounting changeover information element" is added as a piece of added information to the structure pursuant to the "TTC Standard User/Network Interface Signal", the first separate volume (No.3) of Vol. 2. A piece of information saying that the accounting destination is returned to the terminals before the call is held is written in a column of the accounting destination in the "accounting changeover information element" in this case.

When the ISDN (N) receives this retrieve acknowledgement message, the ISDN (N) cancels holding of the call between the originating terminal T1 and the receiving terminal T2, whereby the communications become serviceable between the two users.

Next, procedures of executing the sequence explained above will be explained with reference to flowcharts of FIGS. 23 to 25.

This flow of processing starts with opening a "SETUP" window 16 on the screen 13 of the receiving terminal T1. Then, first, there is determined whether or not the accounting rate is set during a call connection (step S01).

If the accounting rate is not set (when the "ACCOUNTING DESIRED RATE" window 16 can not be opened), a call is set as it is between the originating terminal T1 and the receiving terminal T2. The talk between the two users takes place in accordance with a normal operation (step S13). In this case, charges for services of the communications network are all imposed on the originating user. Note that an interruption of processing of FIGS. 24 and 25 can be done for a duration of even the normal operation.

Contrastingly, when setting the accounting rate in step S01, the originating user opens the "ACCOUNTING DESIRED RATE" window 16 and determines the accounting rate. The originating user then adds that information to the call setting message and outputs the message (step S02). Hereupon, an accounting share requesting message is displayed together with its share rate on the display screen 13 of the receiving terminal T2 (step S03).

Next, the procedure is made variable depending on whether the receiving user is absent or not (step S04). That is, if the receiving user is absent, this flow of procedures. is directly ended. Whereas if not the receiving user is not absent, the procedure is made variable depending on whether or not the receiving user agrees to the sharing request (step S05).

Namely, if the receiving user agrees to the sharing request, the receiving user inputs the function key "YES" 18 and raises the handset 14. Hereupon, the call is set between the originating terminal T1 and the receiving terminal T2, thus making the communications serviceable (step S07). The charges for services of the communications network in this instance are imposed at a rate desired by the originating user. Afterward, when the talk comes to an end (step S08), the accounting information is displayed on the display screens 13 of the originating terminal T1 and of the receiving terminal T2 as well (step S09). Then, this flow of procedures is finished.

Whereas if the receiving user does not agree to the sharing request in step S05, the procedure is made variable depending on whether or not the receiving user talks (step S10). That is, if the receiving user does not talk, the receiving user inputs the function key "NO" and rejects the sharing request (step S12). Then, this procedure is directly ended.

Whereas if the receiving user talks in step S10, the receiving user inputs a self-desired accounting rate in the numeral input portion 19 of the "RECEIVED" window 16 and raises the handset 14 (step S11). Hereupon, the call is set between the originating terminal T1 and the receiving terminal T2, and the communications become serviceable (step S07). The charges for services of the communications network in this instance are imposed at a rate desired by the receiving user. Note that 00% is set as an initial value in the numeral input portion 19 of this "RECEIVED" window 16. Accordingly, if the receiving user rejects the accounting share, the receiving user may raise the handset 14 without changing the setting of the numeral input portion 19 in step S11. The charges for services of the communications network in this case are all imposed on the originating user. When finishing the talk (step S08), the accounting information is displayed on the display screens of both of the originating and receiving terminals (step S09). Then, this procedure comes to an end.

When the originating or receiving user wants to change the accounting rate in the middle of the talk, there starts a flow of in-the-middle-of-talk interrupt processing procedures shown in FIG, 24. That is, the originating or receiving user opens the "ACCOUNTING DESIRED RATE" window on the self-terminal T. Then, the originating or receiving user determines a desired accounting rate and operates the function key and a numeral selecting portion in the "ACCOUNTING DESIRED RATE" window, thus inputting this accounting rate in the "ACCOUNTING DESIRED RATE" window. Thus, the desired accounting rate information is added to the user information message and then outputted (step S16). Hereupon, a message of the accounting sharing request is displayed together with its sharing rate on the display screen 13 of the terminal T of the partner user receiving the user information message (step S17).

Next, the procedures are made variable depending on whether or not this partner user agrees to the sharing request (step S18). Namely, if the partner user agrees to the sharing request, the partner user inputs the function key "YES" (step S19). Then, the next procedure proceeds to step S07. Charges for subsequent talks by using the communications network are to be imposed at a rate presented.

Contrastingly, if the partner user does not agree to the sharing request in step S18, the procedure is made variable depending on whether or not this partner user requests the change of the accounting rate (step S20). That is, if the partner user requests the change in the accounting rate, this partner user inputs a self-desired accounting rate (step S21)o Then, the next procedure proceeds to step S07. The charges for subsequent talks by using the communications network are to be imposed at the rate presented by the partner user.

Whereas if the partner user does not request the change in the accounting rate in step S20, this partner user does not input the function key 18 at all. Then, this interrupt processing of FIG. 24 comes to an end, and, thereafter, the procedure returns to the original processing position. In this case, the charges for services of the communications network are imposed the same as the accounting theretofore.

Figure 25:
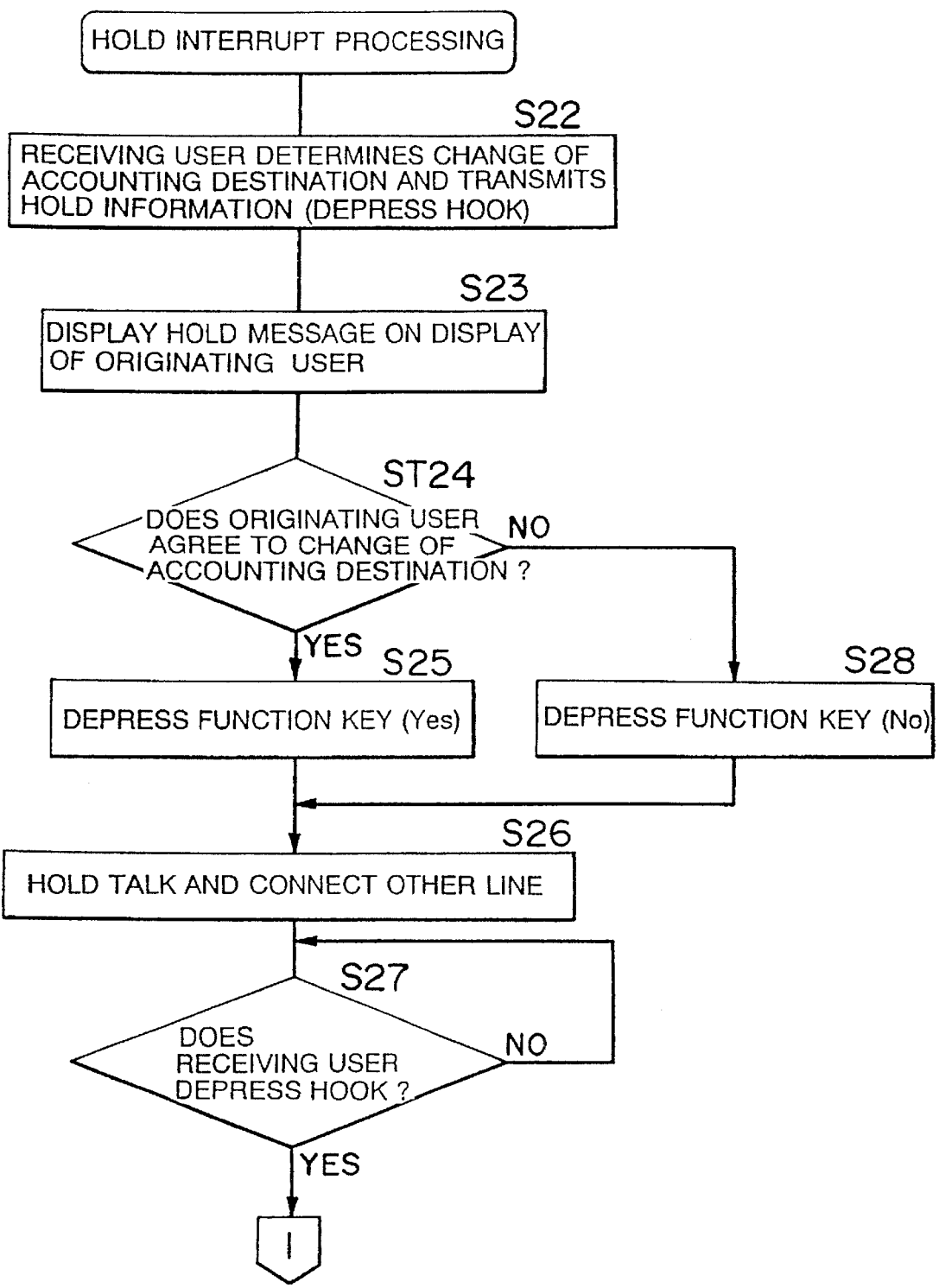
FIG. 25 is a flowchart showing the procedures executed in the communications system in FIG. 2.

When the receiving terminal T2 receives the call setting message from other user in the middle of the talk, there starts a flow of hold interrupt processing procedures of FIG. 25. Specifically, the receiving user, who determines a change of the accounting destination, adds information thereof to the information message and outputs the message (step S22). Displayed then on the display screen 13 of the originating terminal T1 is the hold message together with an indication saying that the accounting destination is changed to the receiving user (saying that the accounting rate imposed on the originating user is 0%) (step S23).

Next, the procedure is made variable depending on whether or not the originating user agrees to a request for a change of the accounting destination (step S24). That is, if the originating user agrees to the request for the change of the accounting destination, the originating user inputs the function key "YES" 18 (step S25)

Whereas if the originating user does not degree to the request for the change of the accounting destination in step S24, the originating user inputs the function key "NO" 18 (step S28).

In any case, next, the talk between the originating terminal T1 and the receiving terminal T2 is held, and a call corresponding to a call setting message given from other user is set (step S26), The charges for services of the communications network during this hold are imposed on the receiving user when passing through step S25 but imposed the same as before when passing through step S28.

Next, there is a wait for a step that the receiving user depresses the hook of the handset, i.e., a step of whether the receiving user holds or cuts off the call from other user (step S27).

Figure 23:
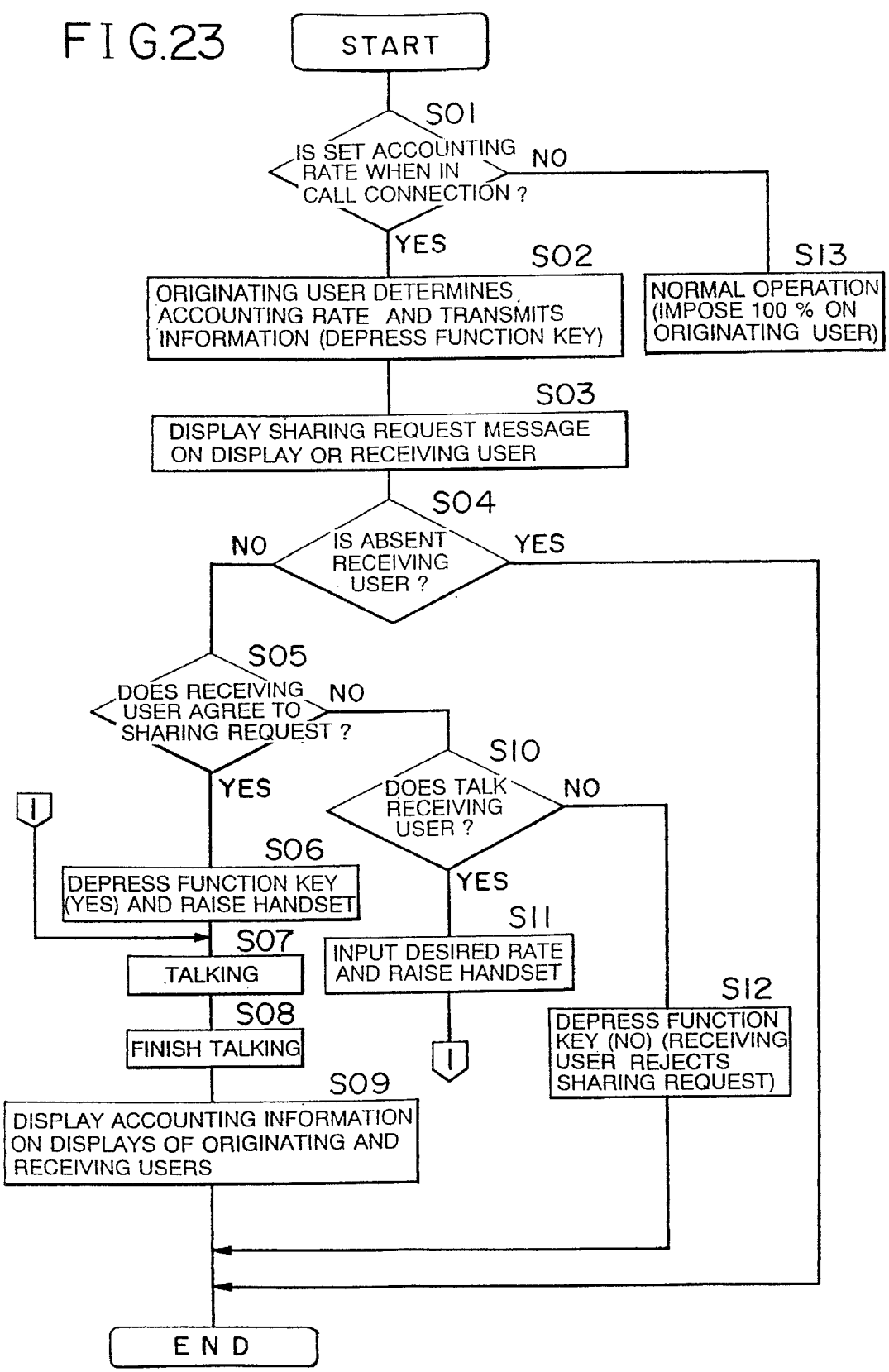
FIG. 23 is a flowchart showing procedures executed in the communications system in FIG. 2.
Figure 24:
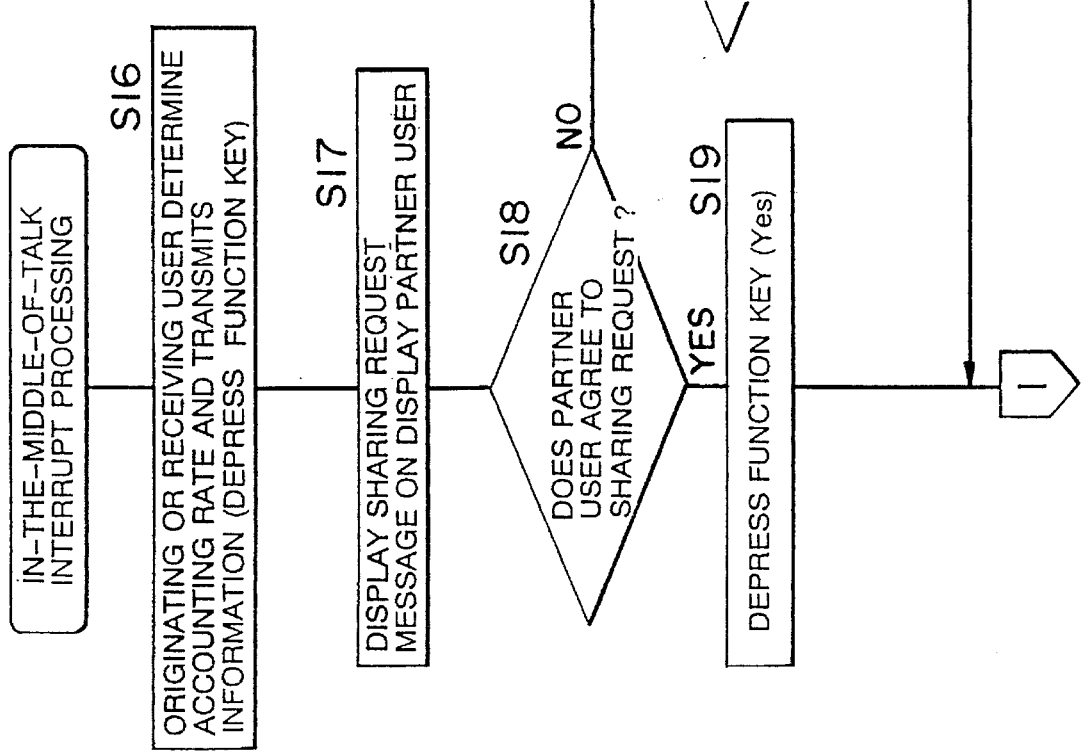
FIG. 24 is a flowchart showing the procedures executed in the communications system in FIG. 2.

When the receiving user depresses the hook, the next procedure proceeds to step S07 of FIG. 23, and the talk becomes effective. The charges for services of the communication network in after are imposed the same as the one that is used before the holding.

When the accounting destination and accounting rate are determined by the accounting rate control section 29 of the receiving central switch S2 as described above, the information is sent to the accounting center M. Further, the receiving central switch S2 causes the accounting information accumulating section 26 to accumulate pieces of count data of the receiving cells and, at the same time, notifies the accounting center M of the count data. The accounting center M calculates whole charge by multiplying the number of the receiving cells after being determined by a fixed amount of money. Then the center M calculates an accounting amount per originating user and receiving user by multiplying the whole charge by a rate determined or changed. Further, when the accounting destination and its accounting rate are changed, the accounting center M calculates, with respect to the receiving cells thereafter, an accounting amount in accordance with the changed accounting destination and the changed accounting rate and adds this calculated amount to the accounting amount theretofore.

Given next is an explanation of an example of an actual communications sequence in accordance with the procedures given above.

Figure 26:
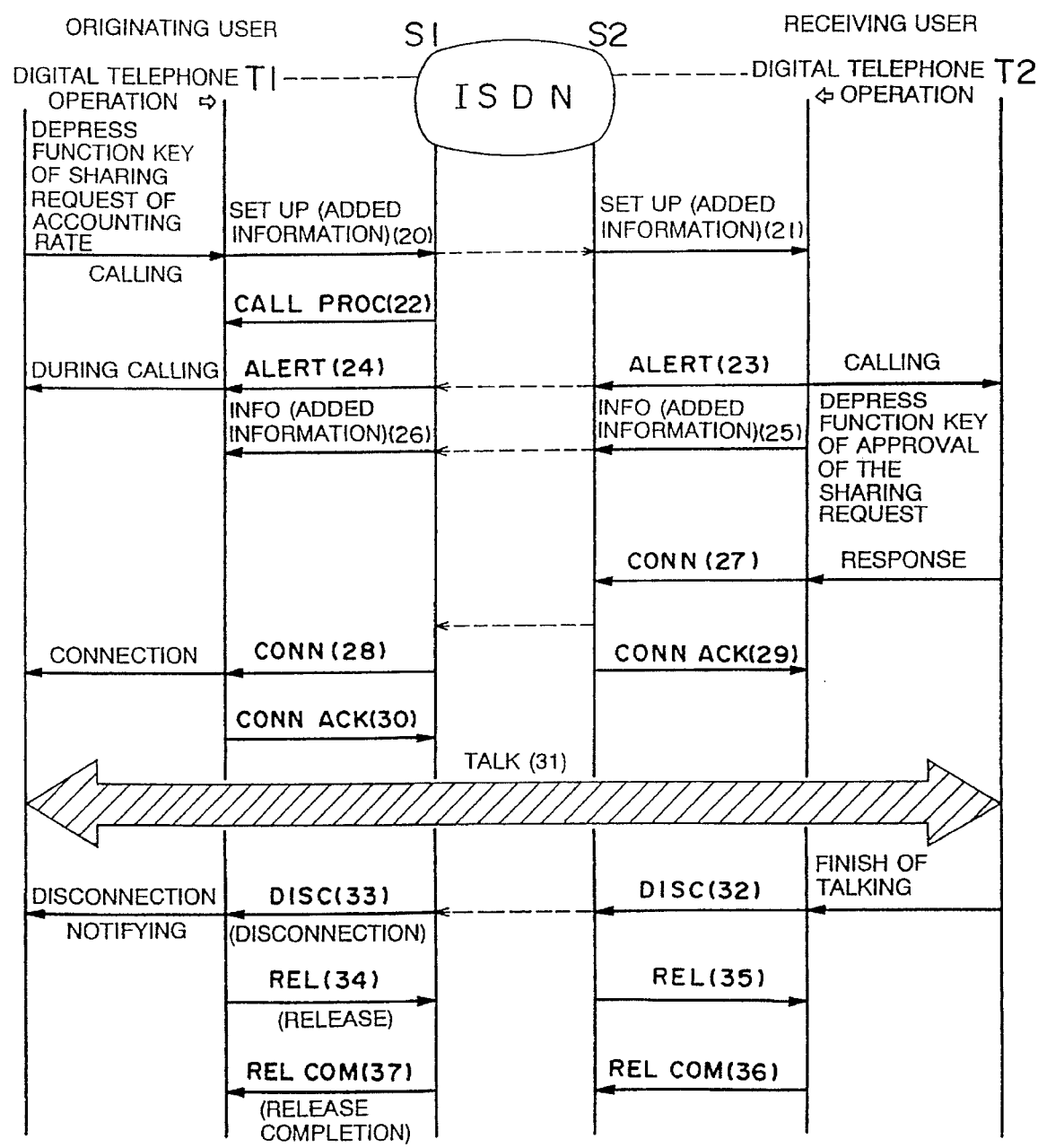
FIG. 26 is a time arrow diagram showing a sequence in the case of making, when setting the call, a sharing request and making an approval of the sharing request.

FIG. 26 shows an example wherein the originating user makes an accounting sharing request when setting the call, and the receiving user agrees to the sharing request.

Referring to FIG. 26, the originating user inputs the accounting rate in the numeral input portion 19 of the "ACCOUNTING DESIRED RATE" window 16 on the screen 13 of the originating terminal T1. The originating user then inputs a subscriber's number of the receiving terminal T2 in the dial key portion 17 of the "SETUP" window 16 and depresses the function key "OK" 18. With this operation, the sharing request information is transmitted as a piece of added information (the "accounting rate information element") of the call setting (SETUP) message to the originating central switch S1 in the ISDN (N) (20). The call setting message is transferred via a proper path (the switch S and the trunk line φ) in the ISDN (N) in accordance with an incoming number, an incoming address, a channel identifier, etc. Then, the call setting message is transmitted from the receiving central switch S2 to the receiving terminal T2 (21).

Note that the originating switch S1 transfers the call setting message to the interior of the ISDN (N) and, at the same time, transmits a call setting accept (CALL PROC) message to the originating terminal T1 (22).

In the receiving terminal T2 receiving the call setting message, the "RECEIVED" window 16 is opened on the screen 13 thereof, and the sharing request from the originating user is displayed therein. That is, there are displayed the subscriber's number of the originating terminal T1 and the accounting rate at which the receiving user is asked for a burden.

The receiving terminal T2 gives the above indication and simultaneously emits a calling sound. When emitting this calling sound, a calling (ALERT) message responding thereto is sent to the ISDN (N) (23). This calling message is transferred within the ISDN (N) and sent to the originating terminal T1 (24). The originating terminal T1 receiving this calling message gives an indication showing an in-calling status.

If the receiving user agrees to the sharing request by seeing the content of the "RECEIVED" window 16, the receiving user depresses the function key "YES" 18 in the "RECEIVED" window 16. With this operation, the information on approval of the sharing request is transmitted as a piece of added information (the "accounting rate information element") to the information (INFO) message to the receiving central switch S2 in the ISDN (N) (25). The information message is transferred within the ISDN (N) in accordance with the incoming number, the incoming address, the channel identifier, etc. which are set therein. Then, the information message is sent out of the originating central switch S1 to the originating terminal T1 (26). At this time, the originating central switch S1 notifies the accounting center of the determined accounting rates at which the originating and receiving users are respectively burdened with the charges.

When the receiving user raises the handset 14, the response message (CONN) is sent to the ISDN (N) (27). Further, the response message is transferred within the ISDN (N) and sent to the originating terminal T1 (28). Note that the receiving central switch S2 receiving the response message sends back a response acknowledgement message to the receiving terminal T2 (29).

The originating terminal T1 receiving the response message gives an indication showing the connection. Further, the originating terminal T1 sends the response acknowledgement message to the ISDN (N) (30).

With the above procedures taken, a call is set between the originating terminal T1 and the receiving terminal T2, whereby the talk between the two terminals becomes serviceable (31). During this talk, the receiving central switch S2 counts a number of actual receiving cells.

When finishing the talk, the receiving user takes down the handset 14. With this operation, the receiving terminal T2 transmits a disconnection (DISC) message to the receiving central switch S2 (32). The receiving central switch S2 receiving this disconnection message sends this disconnection message to the interior of the ISDN (N).

The receiving central switch S1 receiving this disconnection message receives a notice of the accounting information of the originating user from the accounting center M and transmits the accounting information together with the disconnection message to the originating terminal T1 (33).

The originating terminal T1 receiving the disconnection message displays the notice of the disconnection and the accounting information (the accounting amount imposed on the originating user) and, at the same time, sends a release (REL) message to the ISDN (N) (34).

The receiving central switch S2 receives the notice of the accounting information of the receiving user from the accounting center M and transmits the accounting information together with the release message to the receiving terminal T2 (35).

The receiving terminal T2 receiving this release message transferred displays the accounting information (the accounting amount imposed on the receiving user) and, simultaneously, sends a release completion (REL COM) message to the ISDN (N) (36). This release completion (REL COM) message is also received by the originating terminal T1 (37). Upon receiving this release completion message, the call is released.

Figure 27:
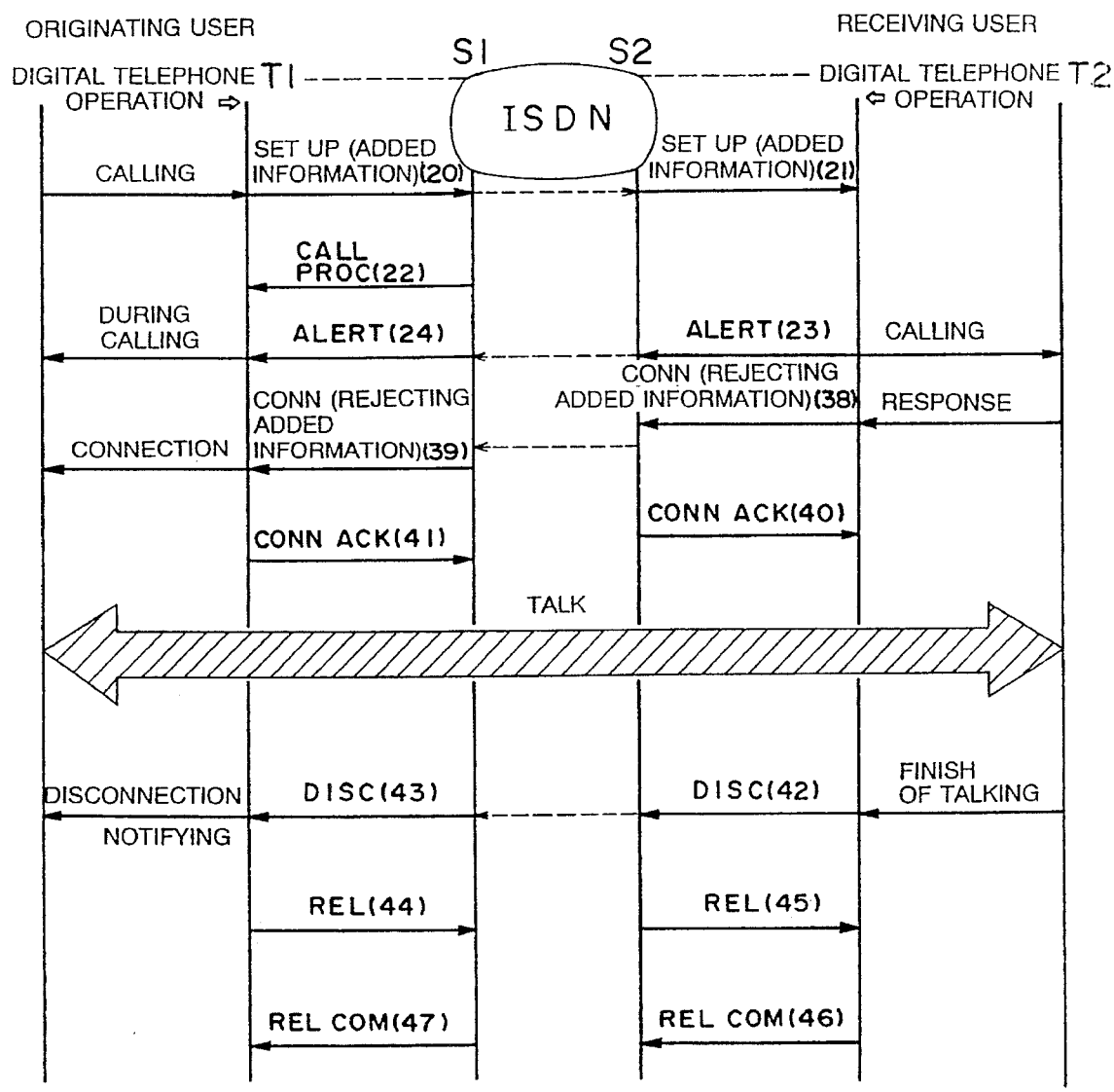
FIG. 27 is a time arrow diagram showing a sequence in the case of making, when setting the call, the sharing request but rejecting the sharing request while a connection is performed.

FIG. 27 illustrates an example wherein the originating user makes an accounting sharing request when setting the call, the receiving user rejects the sharing request, (an accounting rate desired by the receiving user is not also inputted), and the call is connected.

Referring to FIG. 27, the originating user inputs the accounting rate in the numeral input portion 19 of the "ACCOUNTING DESIRED RATE" window 16 on the screen 13 of the originating terminal T1. The originating user then inputs the subscriber's number of the receiving terminal T2 in the dial key portion 17 of the "SETUP" window 16 and depresses the function key "OK" 18. With this operation, the sharing request information is transmitted as a piece of added information (the "accounting rate information element") of the call setting (SETUP) message to the originating central switch S1 in the ISDN (N) (20). The call setting message is transferred via a proper path (the switch S and the trunk line φ) within the ISDN (N) in accordance with the incoming number, the incoming address, the channel identifier, etc. which are set therein. Then, the call setting message is sent from the receiving central switch S2 to the receiving terminal T2 (21).

Note that the originating central switch S1 transfers the call setting message to the interior of the ISDN (N) and, at the same time, transmits the call setting accept (CALL PROC) message to the originating terminal T1 (22).

In the receiving terminal T2 receiving the call setting message, the "RECEIVED" window 16 is opened on the screen 13 thereof, and the sharing request from the originating user is displayed therein. That is, there are displayed the subscriber's number of the originating terminal and the accounting rate at which the receiving user is asked for a burden. At this time, 00% is displayed as an initial value in the numeral input portion 19 of the "RECEIVED" window 16.

The receiving terminal T2 gives the above indication and simultaneously emits the calling sound. When emitting this calling sound, the calling (ALERT) message responding thereto is sent to the ISDN (N) (23). This calling message is transferred within the ISDN (N) and sent to the originating terminal T1 (24). The originating terminal T1 receiving this calling message gives the indication showing the in-calling status.

If the receiving user rejects the sharing request by seeing the content of the "RECEIVED" window 16 but does not input a self-desired accounting rate, nothing is inputted, and the receiving user raises the handset 14. Hereupon, the receiving terminal T2 transmits, to the receiving central switch S2 within the ISDN (N), a response (CONN) message to which a piece of information (the "accounting rate information element") on the rejection of the sharing request (the accounting rate=non-approval, the desire for changing the accounting rate=YES, and the change desired accounting rate=10:0) is added (38). This response message is transferred within the ISDN (N) and transmitted to the originating terminal T1 (39). Note that the receiving central switch S2 receiving the response message sends back the response acknowledgement message to the receiving terminal T2 (40).

The originating terminal T1 receiving this response message gives the indication showing the connection. Further, the originating terminal T1 sends the response acknowledgement message to the ISDN (N) (41). At this time the originating central switch S1 notifies the accounting center M that the originating user is burdened with all of the accounting amount.

With the above procedures taken, a call is set between the originating terminal T1 and the receiving terminal T2, whereby the talk between the two terminals becomes serviceable. During this talk, the receiving central switch S2 counts a number of actual receiving cells.

When finishing the talk, the receiving user takes down the handset 14. With this operation, the receiving terminal T2 transmits the disconnection (DISC) message to the receiving central switch S2 (42). The receiving central switch S2 receiving this disconnection message sends this disconnection message to the interior of the ISDN (N).

The receiving central switch S1 receiving this disconnection message receives a notice of the accounting information of the originating user from an accounting center M and transmits the accounting information together with the disconnection message to the originating terminal T1 (43).

The originating terminal T1 receiving the disconnection message displays the notice of the disconnection and the accounting information (the accounting amount imposed on the originating user) and, at the same time, sends the release (REL) message to the ISDN (N) (44).

The receiving central switch S2 receives the notice of the accounting information of the receiving user from the accounting center M and transmits the accounting information together with the release message to the receiving terminal T2 (45).

The receiving terminal T2 receiving this release message transferred displays the accounting information (the accounting amount imposed on the receiving user) and, simultaneously, sends the release completion (REL COM) message to the ISDN (N) (46). This release completion (REL COM) message is also received by the originating terminal T1 (47). Upon receiving this release completion message, the call is released°

Figure 28:
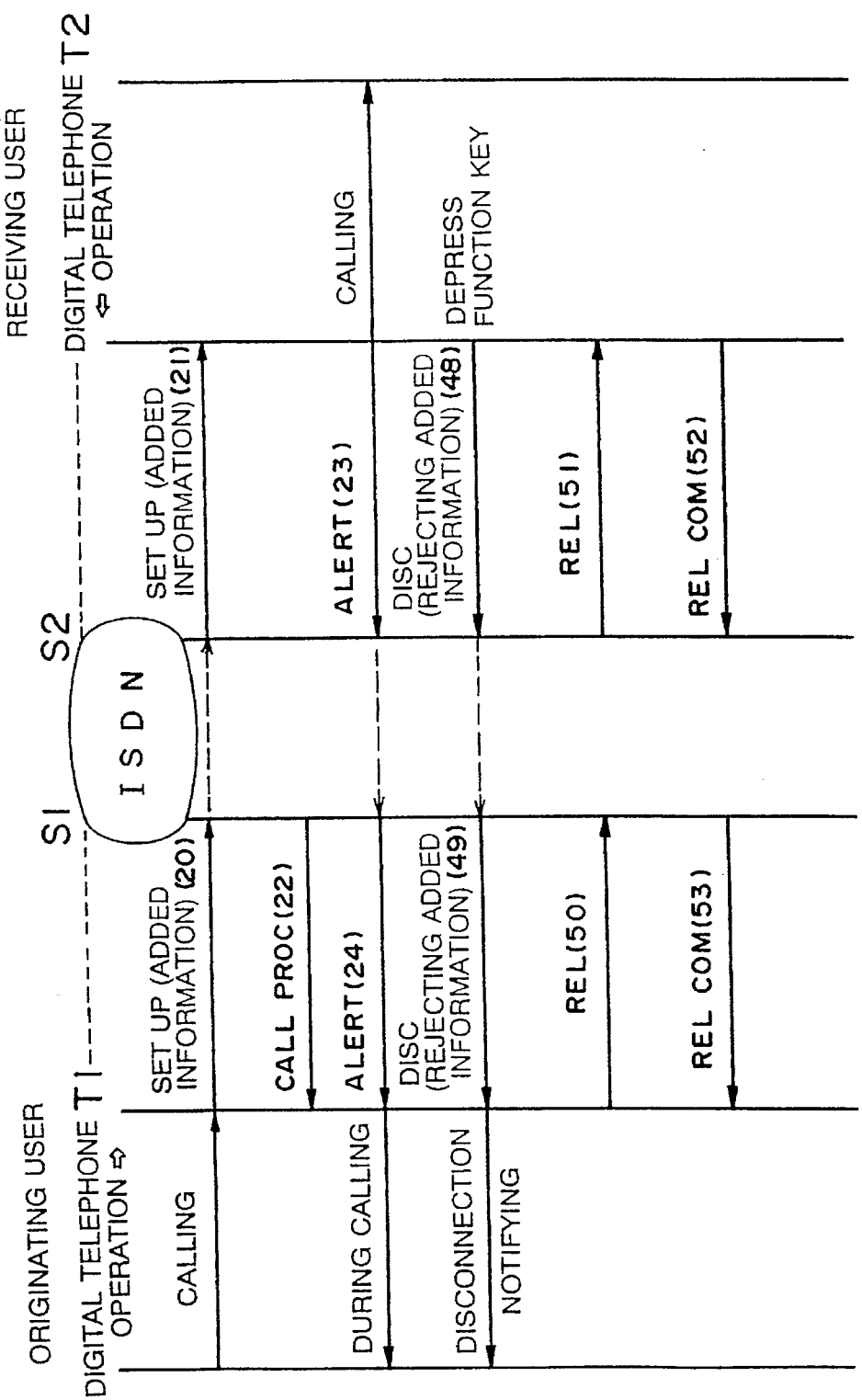
FIG. 28 is a time arrow diagram showing a sequence in the case of making, when setting the call, the sharing request but rejecting the sharing request and the connection as well.

FIG. 28 illustrates an example wherein the originating user makes the accounting sharing request when setting the call, the receiving user rejects the sharing request, and the call connection is also rejected.

Referring to FIG. 28, the originating user inputs the accounting rate in the numeral input portion 19 of the "ACCOUNTING DESIRED RATE" window 16 on the screen 13 of the originating terminal T1. The originating user then inputs the subscriber's number of the receiving terminal T2 in the dial key portion 17 of the "SETUP" window 16 and depresses the function key "OK" 18. With this operation, the sharing request information is transmitted as a piece of added information (the "accounting rate information element") of the call setting (SETUP) message to the originating central switch S1 in the ISDN (N) (20). The call setting (SETUP) message is transferred via a proper path (the switch S and the trunk line φ) within the ISDN (N) in accordance with the incoming number, the incoming address, the channel identifier, etc. which are set therein. Then, the call setting message (SETUP) is sent from the receiving central switch S2 to the receiving terminal T2 (21).

Note that the originating central switch S1 transfers the call setting message to the interior of the ISDN (N) and, at the same time, transmits the call setting accept (CALL PROC) message to the originating terminal T1 (22).

In the receiving terminal T2 receiving the call setting message, the "RECEIVED" window 16 is opened on the screen 13 thereof, and the sharing request from the originating user is displayed therein. That is, there are displayed the subscriber's number of the originating terminal T1 and the accounting rate at which the receiving user is asked for a burden.

The receiving terminal T2 gives the above indication and simultaneously emits the calling sound. When emitting this calling sound, the calling (ALERT) message responding thereto is sent to the ISDN (N) (23). This calling message is transferred within the ISDN (N) and sent to the originating terminal T1 (24). The originating terminal T1 receiving this calling message gives the indication showing the in-calling status.

If the receiving user rejects the sharing request by seeing the content of the "RECEIVED" window 16 and, besides, rejects the talk, the receiving user depresses the function key "NO" 18 in the "RECEIVED" window 16. With this operation, the receiving terminal T2 transmits the disconnection (DISC) message added with a piece of information on the rejection of the connection to the receiving central switch S2 (48). The receiving central switch S2 receiving this disconnection message transfers this disconnection message within the ISDN (N) and transmits the message from the originating central switch S1 to the originating terminal T1 (49).

The originating terminal T1 receiving the disconnection message displays the notice of the disconnection and, at the same time,transmits the release (REL) message to the ISDN (N) (50).

The receiving central switch S2 transmits this disconnection message to the receiving terminal T2 (51).

The receiving terminal T2 receiving this release message sends the release completion (REL COM) message to the ISDN (N) (52). This release completion (REL COM) message is also received by the originating terminal T1 (53). Upon receiving this release completion message, the call is released.

Figure 29:
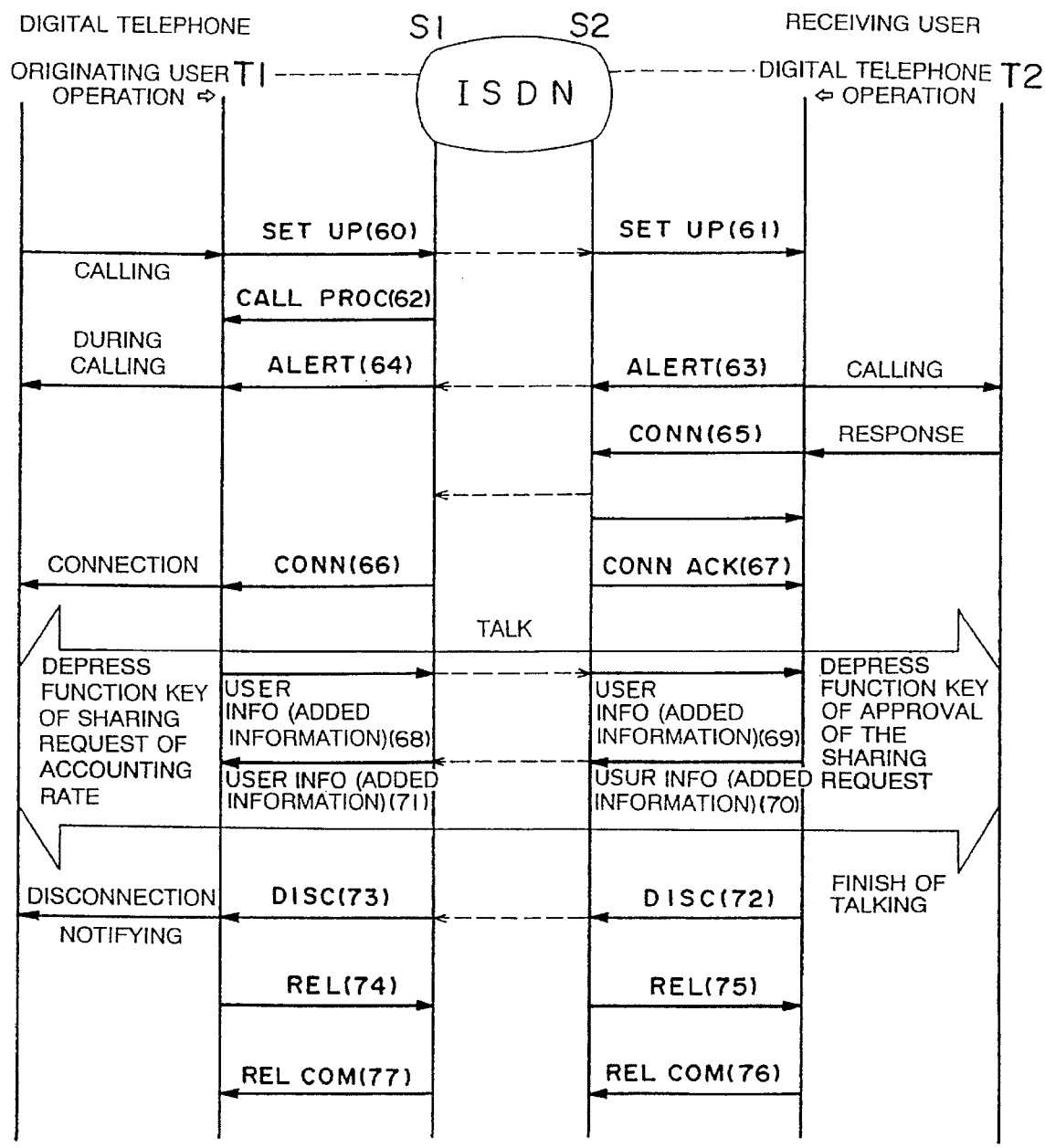
FIG. 29 is a time arrow diagram showing a sequence in the case of making the sharing request from the originating user and making the approval of the sharing request in the middle of a talk.

FIG. 29 illustrates an example wherein the originating user makes the accounting sharing request during the talk, and the receiving user agrees to the sharing request.

Referring to FIG. 29, the originating user inputs the subscriber's number of the receiving terminal T2 in the dial key portion 17 of the "SETUP" window 16 and depresses the function key "OK" 18. With this operation, the call setting (SETUP) message is transmitted to the originating central switch S1 in the ISDN (N) (60). The call setting message is transferred via a proper path (the switch S and the trunk line φ) within the ISDN (N) in accordance with the incoming number, the incoming address, the channel identifier, etc. which are set therein. Then, the call setting message is sent from the receiving central switch S2 to the receiving terminal T2 (61).

Note that the originating central switch S1 transfers the call setting message to the interior of the ISDN (N) and, at the same time, transmits the call setting accept (CALL PROC) message to the originating terminal T1 (62).

The receiving terminal T2 receiving the call setting message emits the calling sound. When emitting this calling sound, the calling (ALERT) message responding thereto is sent to the ISDN (N) (63). This calling message is transferred within the ISDN (N) and sent to the originating terminal T1 (64). The originating terminal T1 receiving this calling message gives the indication showing the in-calling status.

When the receiving user raises the handset 14, the receiving terminal T2 transmits the response (CONN) message to the receiving central switch S2 within the ISDN (N) (65). This response message is transferred within the ISDN (N) and transmitted to the originating terminal T1 (66). Note that the receiving central switch S2 receiving the response message sends back the response acknowledgement (CONN ACK) message to the receiving terminal T2 (67).

The originating terminal T1 receiving the response message gives the indication showing the connection. At this time, the originating central switch S1 notifies the accounting center M that the originating user is burdened with all of the accounting amount.

With the above procedures taken, a call is set between the originating terminal T1 and the receiving terminal T2, whereby the talk between the two terminals becomes serviceable. During this talk, the receiving central switch S2 counts a number of actual receiving cells and notifies the accounting center M of the number of the receiving cells.

If the originating user desires a change of the accounting rate in the middle of the talk, the originating user opens an "IN-COMMUNICATIONS RATE CHANGE" window and "ACCOUNTING DESIRED RATE" window 16 on the screen 13 of the originating terminal T1. Then, the originating user inputs a desired accounting rate in the numeral input portion 19 of the "ACCOUNTING DESIRED RATE" window 16 and depresses an unillustrated function key of "YES" of the "IN-COMMUNICATIONS RATE CHANGE" window.

With this operation, the sharing request information is transmitted as a piece of added information (the "accounting rate information element") of a user information (USER INFO) message to the originating central switch S1 within the ISDN (N) (68). This user information message is transferred within the ISDN (N) and transmitted from the receiving central switch S2 to the receiving terminal T2 (69).

In the receiving terminal T2 receiving the user information message, the "RECEIVED" window 16 is opened on the screen 13 thereof, and the sharing request from the originating user is displayed therein. That is, there are displayed the subscriber's number of the originating terminal and the accounting rate at which the receiving user is asked for a burden.

If the receiving user agrees to the sharing request by seeing the content of the "RECEIVED" window 16, the receiving user depresses the function key "YES" 18 in the "RECEIVED" window 16. With this operation, the information on approval of the sharing request is transmitted as a piece of added information (the "accounting rate information element") of the user information message to the receiving central switch S2 in the ISDN (N) (70). The information message is transferred within the ISDN (N) and sent from the originating central switch S1 to the originating terminal T1 (71). At this time, the originating central switch S1 notifies the accounting center M of the accounting rates respectively imposed on the originating user and the receiving user which is determined to be changed. Hence, with respect to the receiving cells after this, the charges are imposed on the originating user and/or the receiving user according to the changed accounting rates.

When finishing the talk, the receiving user takes down the handset 14. With this operation, the receiving terminal T2 transmits the disconnection (DISC) message to the receiving central switch S2 (72). The receiving central switch S2 receiving this disconnection message sends this disconnection message to the interior of the ISDN (N).

The receiving central switch S1 receiving this disconnection message receives a notice of the accounting information of the originating user from the accounting center M and transmits the accounting information together with the disconnection message to the originating terminal T1 (73).

The originating terminal T1 receiving the disconnection message displays the notice of the disconnection and the accounting information (the accounting amount imposed on the originating user) and, at the same time, sends the release (REL) message to the ISDN (N) (74).

The receiving central switch S2 receives the notice of the accounting information of the receiving user from the accounting center M and transmits the accounting information together with the release message to the receiving terminal T2 (75).

The receiving terminal T2 receiving this release message transferred displays the accounting information (the accounting amount imposed on the receiving user) and, simultaneously, sends the release completion (REL COM) message to the ISDN (N) (76). Similarly, this release completion (REL COM) message is also received by the originating terminal T1 (77). Upon receiving this release completion message, the call is released.

Figure 30:
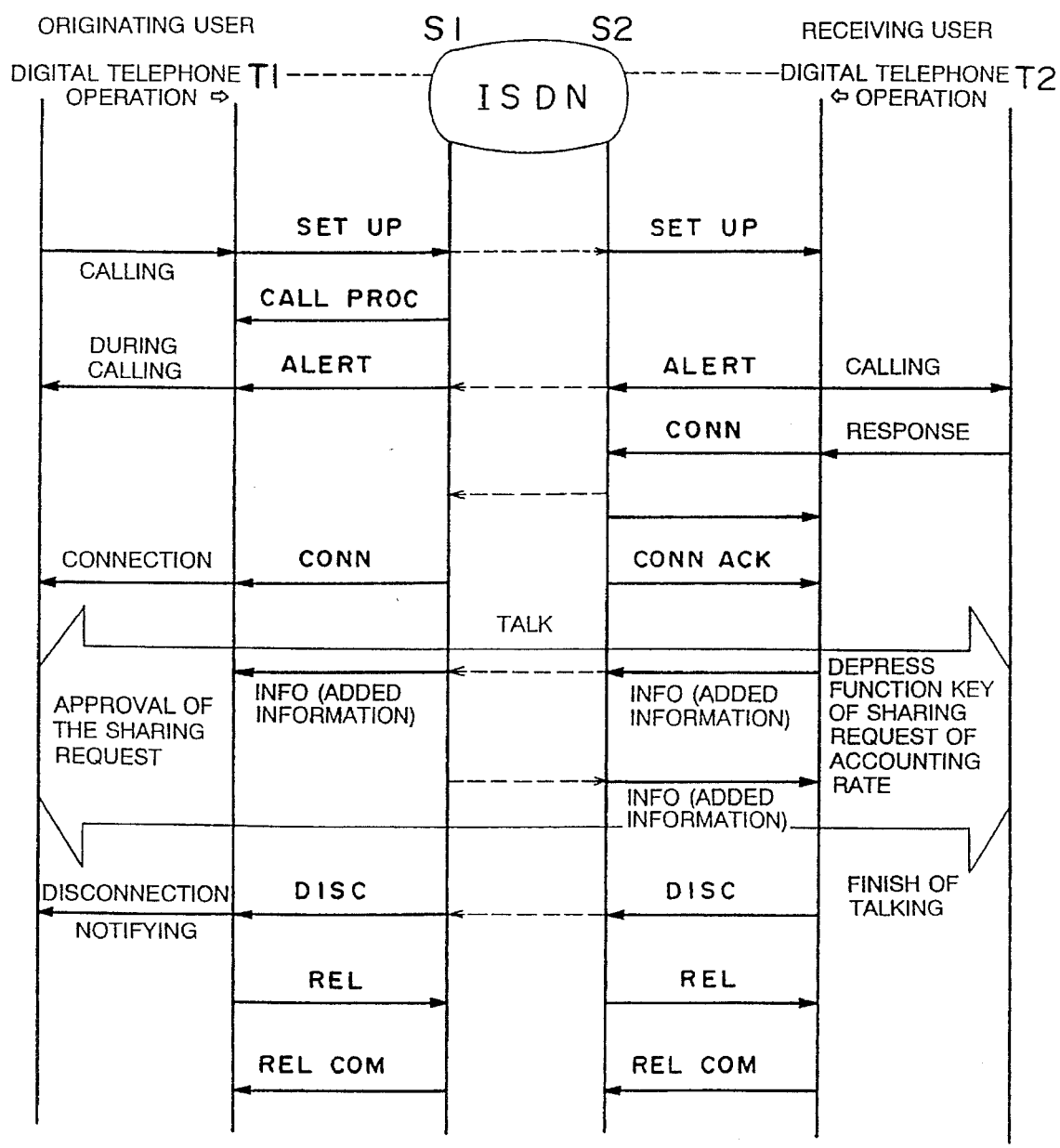
FIG. 30 is a time arrow diagram showing a sequence in the case of making the sharing request from the receiving user and making the approval of the sharing request in the middle of the talk.

FIG. 30 illustrates an example wherein the receiving user makes the accounting sharing request in the middle of the talk, and the originating user agrees to the sharing request. This example is the same as that of FIG. 29 except that the receiving user makes the accounting sharing request, and the explanation is therefore omitted.

Figure 31:
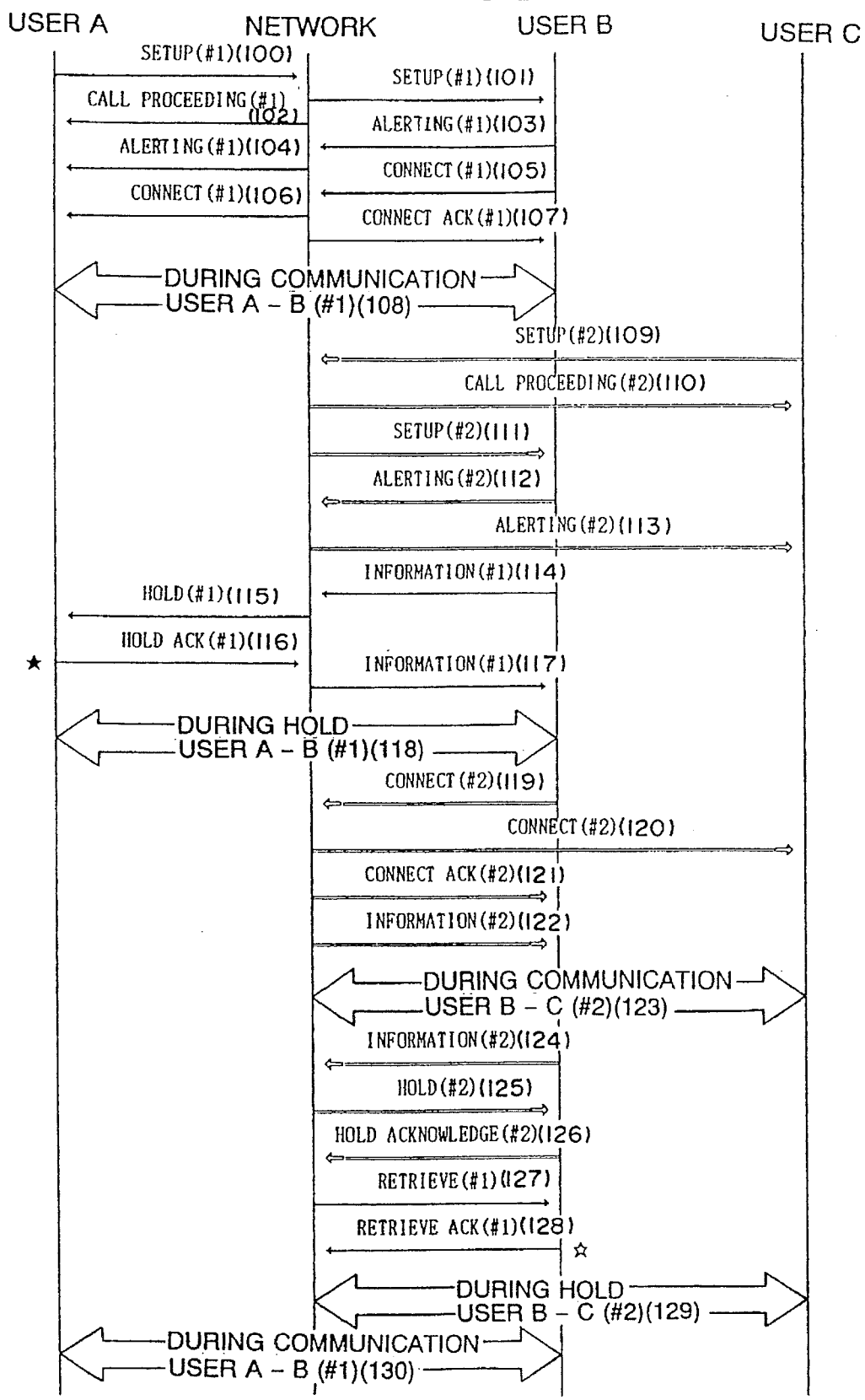
FIG. 31 is a time arrow diagram showing a sequence in the case of holding the call because of a call-in from other terminal in the middle of the talk.
Figure 32:
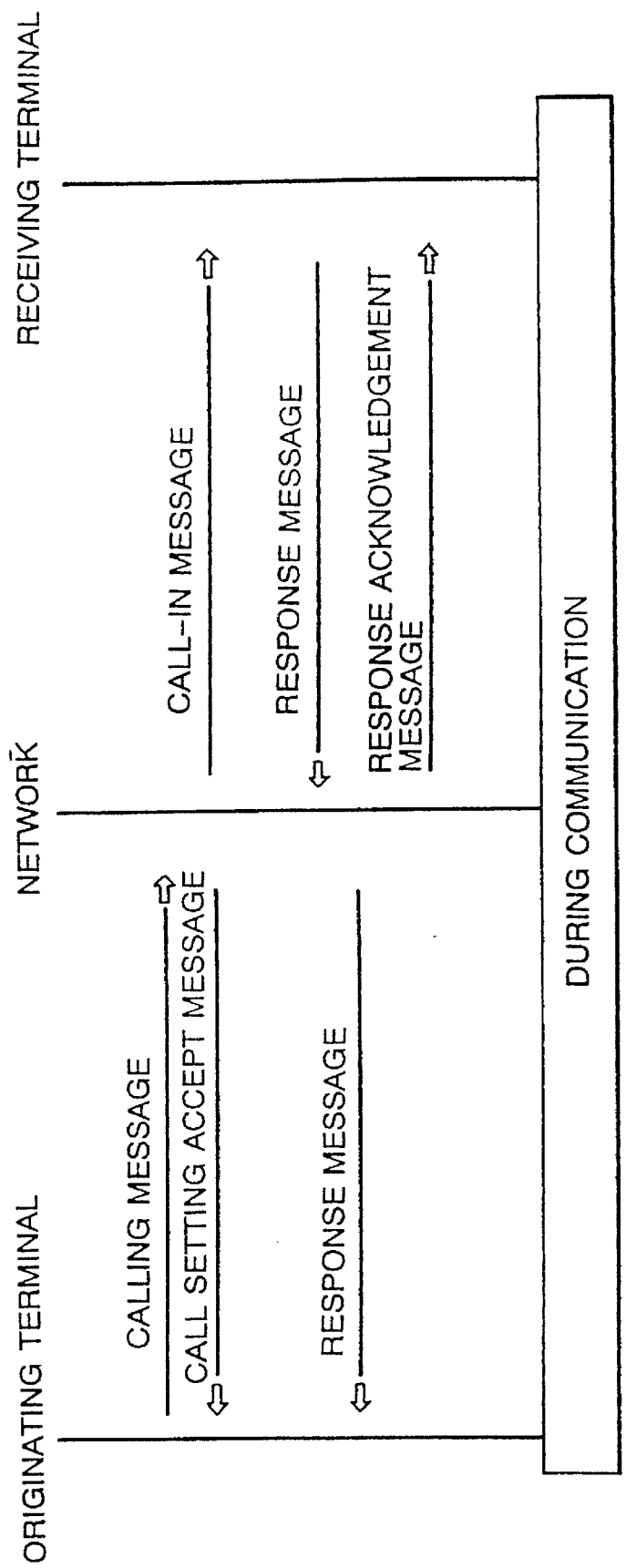
FIG. 32 is a time arrow diagram of assistance in explaining the prior art.

FIG. 31 shows an example wherein the accounting sharing request is not made when setting the call, the receiving user receives a call-in from other user, and a call from the originating user is held. Referring to FIG. 31, the symbol #1 designates a message relative to a first call, and #2 represents a message relative to a second call. Further, a "user A" indicates an originating user of the first call and a terminal T thereof, while a "user B" indicates a receiving user of the first and second calls and a terminal T thereof. A "user C" indicates an originating user of the Second call and a terminal T thereof.

Referring to FIG. 31, the user A inputs a subscriber's number of the terminal of the user B in the dial key portion 17 of the "SETUP" window 16 on the screen 13 of the terminal and depresses the function key "OK" 18. With this operation, the call setting (SETUP) message is transmitted to the interior of the ISDN (N) (100). The call setting (SETUP) message is transferred via a proper path in the ISDN (N) in accordance with the incoming number, the incoming address, the channel identifier, etc. which are set therein. Then, the call setting (SETUP) message is transmitted to the terminal of the user B (101).

Note that the ISDN (N) transmits the call setting (SETUP) message to the terminal of the user B and, at the same time, transmits the call setting accept (CALL PROCEEDING) message to the terminal of the user A (102).

The user B terminal receiving the call setting (SETUP) message emits the calling sound. When emitting this calling sound, a calling (ALERTING) message responding thereto is sent to the ISDN (N) (103). This calling (ALERTING) message is transmitted to the terminal of the user A (104).

When the user B raises the handset 14, the user B terminal transmits a response (CONNECT) message to the ISDN (N) (105). This response (CONNECT) message is sent out of the ISDN (N) to the user a terminal (106). Note that the ISDN (N) receiving the response (CONNECT) message sends back a response acknowledge (CONNECT ACK) message to the user B terminal (107). At this moment, the ISDN (N) notifies the accounting center M that the user A is burdened with all of the accounting amount relative to the first call.

With the above procedures taken, the first call is set between the user A terminal and the user B terminal, whereby the talk between the two terminals becomes serviceable (108). During this talk, the ISDN (N) counts a number of actual receiving cells and notifies the accounting center M of the number of the actual receiving cells.

If there is the incoming of the second call from the user C during the talk through this first call (109–113), the user B depresses an unillustrated hook for the handset 14. Hereupon, an information (INFORMATION) message containing an item of data that the hold is desired is transmitted from the user B terminal to the ISDN (N) (114).

The ISDN (N) receiving the information message transmits the hold (HOLD) message to the user A terminal (115). Upon receiving this hold (HOLD) message, a "HOLD" window is opened on the screen 13 of the user A terminal. Displayed subsequently in this "HOLD" window is that the accounting rate imposed on the user A is 0%.

If the user A agrees to this accounting rate, the user A inputs the function key "YES" 18 in the "HOLD" window. Transmitted then to the ISDN (N) is a hold acknowledgement (HOLD ACK) message to which information of the "accounting changeover information element" is added as a piece of added information (116).

The ISDN (N) receiving this hold acknowledgement (HOLD ACK) message notifies the accounting center M of a content that the user B is burdened with all of the accounting amount relative to the first call. Simultaneously, the ISDN (N) transmits the information (INFORMATION) message to the user B terminal (117). With the above-mentioned, the first call from the originating terminal T1 is held (118).

Further, the user B terminal receiving the information message transmits a response (CONNECT) message concerning to the second call to the ISDN (N) (119). This response (CONNECT) message is transferred from the ISDN (N) to the user C terminal (120). Note that the ISDN (N) receiving the response (CONNECT) message sends back the response acknowledgement (CONNECT ACK) message to the user B terminal (121).

Moreover, the ISDN (N) transmits the information (INFORMATION) message to the user B terminal (122). Hereupon, the second call is set between the user C terminal and the user B terminal, whereby the talk between the two terminals becomes serviceable (123). During this talk also, the ISDN (N) counts a number of receiving cells (containing null data) transmitted from the user A to the user B and notifies the accounting center M of this number of the receiving cells. All the charges for these cells are imposed on the user B.

If the user B desires a talk corresponding to the first call by holding the second call during the talk corresponding to this second call, the user B depresses the unillustrated hook for the handset 14. Then, the information (INFORMATION) message containing an item of data saying that the second call is desired to be held is transmitted from the user B terminal to the ISDN (N) (124).

The ISDN (N) receiving the information (INFORMATION) message transmits the hold (HOLD) message concerning to the second call to the user B terminal (125). Upon receiving this hold (HOLD) message, the user B terminal sends back the hold acknowledgement (HOLD ACKNOWLEDGE) message concerning to the second call to the ISDN (N) (126).

The ISDN (N) receiving this hold acknowledgement (HOLD ACKNOWLEDGE) message next transmits a retrieve (RETRIEVE) message concerning to the first call to the user B terminal (127). On receiving this retrieve (RETRIEVE) message, the user B terminal sends back a retrieve acknowledgement (RETRIEVE ACK) message to the ISDN (N) (128). This retrieve acknowledgement (RETRIEVE ACK) message contains an item of data saying that the accounting destination relative to the first call is returned to the original status (all the accounting amount is imposed on the user A).

The second call is held (129), while the hold of the first call is released through the above-mentioned procedures. Accordingly, the talk is allowed to resume between the user A terminal and the user B terminal (130). At this time, the ISDN (N) notifies the accounting center M that the user A is burdened with all the accounting amount relative to the first call thereafter.

The talk and the hold are repeated thereafter, and finally the first call is released. At this moment, the accounting center M adds up a total of the accounting amount imposed on the user A and a total of the accounting amount imposed on the user B with respect to the first call. The accounting center M then notifies both of the terminals of the sum thereof.

The embodiment discussed above has dealt with the example where the accounting rate is changed once during the talk. According to the flowcharts of FIGS. 23 through 25, however, the accounting rate may be, as a matter of course, changed a plurality of times. In this case, the accounting center M applies an accounting rate after being changed to the receiving cells after a point of time when the accounting rate has been changed. Then, the accounting center M calculates an accounting amount based on an accounting rate at each point of time and accumulates results of these calculations. As discussed above, according to the accounting system of this invention, it is possible for the users to arbitrarily change the accounting specification with respect to the originating and receiving users in the middle of the communications.

This invention being thus described, it will be obvious that the same may be varied in same ways. Such variations are not to be regarded as a departure from the spirit and scope of the invention, and all such modifications as would be obvious to one skilled in the art are intended to be included within the scope of the following claims.

What is claimed is:

1. An accounting method of communication charges for communications between a plurality of terminals connected to each other via a communications network, the accounting method comprising the steps of:

transmitting a first information indicating that an accounting sharing rate between respective terminals with respect to the communication charges is changed from a first sharing rate corresponding to an accounting sharing rate used for accounting the communication charges between the respective terminals prior to said transmitting step, to a second arbitrary sharing rate, from one terminal of said respective terminals to said communications network, at arbitrary timing in the middle of the communication;

detecting the transmission of the first information; and imposing the communication charges for a communication after detecting the transmission of the first information, on at least one of said one terminal and another terminal of said respective terminals in accordance with the second sharing rate.

2. An accounting method according to claim 1, further comprising the steps of:
   transmitting the first information from said communications network to said another terminal; and
   imposing the communication charges after the first information has been transmitted on at least one of said one terminal and said another terminal in accordance with the second sharing rate only when a second information indicating an agreement on the second rate is transmitted from said another terminal to said communications network.

3. An accounting method according to claim 2, further comprising the steps of:
   imposing, when a third information indicating that the accounting sharing rate should be changed to a third sharing rate different from the first sharing rate is transmitted from said another terminal in response to said first information, the communication charges after the third information has been transmitted, on said at least one of said one terminal and said another terminal in accordance with the third sharing rate.

4. An accounting method according to claim 1 or 2, wherein the second sharing rate is an accounting sharing rate at which all the communication charges are imposed on said one terminal.

5. An accounting method of communication charges for communications between a plurality of terminals connected to each other via a communications network, the accounting method comprising the steps of:
   detecting that information indicating a hold of a communication with a connection through said communications network maintained, is transmitted from one of said terminals to said communications network, in the middle of the communication; and
   imposing all the communication charges after detecting the transmission of the information on said one of said terminals.

6. An accounting method according to claim 5, wherein said communications network holds the communications between a first terminal and a second terminal with a connection of the first terminal and the second terminal maintained when a third terminal makes a request for performing the communication with one of said first and second terminals during an execution of the communications between said first terminal and said second terminal, and, at the same time, said communications network connects said one of said first and second terminals to said third terminal and makes the communications between said connected terminals serviceable.

7. An accounting method according to claim 5, further comprising the step of imposing, when the hold is released, the communication charges after releasing the hold on at least one of said one of said terminals and another of said terminals in accordance with the same accounting condition as that before transmitting the information that the communications are held.

8. An accounting method according to claim 1, further comprising the step of imposing, at the start of communications, the communication charges on said at least one of said one terminal and said another terminal in accordance with the second sharing rate, if setting information indicating that the accounting sharing rate between said respective terminals with respect to the communication charges is changed to the second sharing rate, is transmitted from said one terminal to said network.

9. A communications system comprising:
   a communications network; and
   a terminal,
   said terminal including:
      (a) setting means for setting a sharing rate at which charges for communication with other terminal are shared; and
      (b) first transmitting means for transmitting a first information about a charge sharing rate set by said setting means to said communications network at arbitrary timing in the middle of the communications, said charge sharing rate being arbitrary;
   said communications network relaying the communication between said terminal and said other terminal, imposing the charges for the communication between said terminal and said other terminal on at least one of said terminal and said other terminal and, upon receiving said first information about the charge sharing rate from said terminal, imposing the charges for the communication on the basis of the received charge sharing rate.

10. A communications system according to claim 9, wherein said communications network transmits, upon receiving the first information about the charge sharing rate from said terminal, the first information to said other terminal.

11. A communications system according to claim 10, wherein each said terminal includes:
    displaying means for displaying, when the first information about the charge sharing rate transmitted from said communications network is received, the charge sharing rate;
    inputting means for inputting a second information indicating whether there is an agreement on the charge sharing rate between said one and other terminals; and
    second transmitting means for transmitting the second information inputted from said inputting means to said communications network, and
    wherein said communications network imposes the communication charges on the basis of the charge sharing rate only when the second information transmitted from said terminal indicates an agreement on the charge sharing rate.

12. A communications system according to claim 11, wherein said communications network imposes, when said other terminal rejects an agreement on the charge sharing rate transmitted from said one terminal and when the charge sharing rate set by said other terminal is transmitted from said other terminal to the communications network, the charges on the basis of the charge sharing rate transmitted from said other terminal.

13. A terminal station, connected to a communications network and comprising:
    (a) setting means for setting a sharing rate at which charges for communication of one terminal with another terminal are shared; and
    (b) transmitting means for transmitting information about the charge sharing rate set by said setting means to said communications network at arbitrary timing in the middle of the communication;

said terminal station imposing charges for the communication on the basis of the charge sharing rate received by said communications network, on at least one of said one terminal and said another terminal, upon reception of said information about the charge sharing rate from said terminal station by the communications network, said charge sharing rate being arbitrary.

14. A communications system accommodating a plurality of terminals for relaying communication between the terminals and comprising:

receiving means for receiving information about a charge sharing rate set by one of the terminals at arbitrary timing in the middle of the communication, and accounting means for imposing charges for the communication between the terminals on at least one of the terminals on the basis of the received charge sharing rate from one of the terminals, said charge sharing rate being arbitrary.

* * * * *